United States Patent
Okada et al.

(10) Patent No.: US 7,223,963 B2
(45) Date of Patent: May 29, 2007

(54) OPTICAL ENCODER

(75) Inventors: Norikazu Okada, Kashihara (JP); Hirohisa Warita, Kitakatsuragi-gun (JP); Hiroki Nakamura, Osakasayama (JP); Kazufumi Oki, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 168 days.

(21) Appl. No.: 10/911,640

(22) Filed: Aug. 5, 2004

(65) Prior Publication Data
US 2005/0051715 A1 Mar. 10, 2005

(30) Foreign Application Priority Data
Aug. 8, 2003 (JP) ............... P2003-289817

(51) Int. Cl.
G01D 5/34 (2006.01)
G01D 5/36 (2006.01)
H03M 1/22 (2006.01)
G01B 11/14 (2006.01)

(52) U.S. Cl. ............... 250/231.13; 250/237 G; 341/13; 356/614

(58) Field of Classification Search ......... 250/231.13, 250/231.14, 231.16, 231.17, 231.18, 237, 250/237 G, 231.15; 356/616, 614; 33/1 PT, 33/1 N; 341/11, 13, 31, 14
See application file for complete search history.

(56) References Cited

U.S. PATENT DOCUMENTS 4,654,525 A * 3/1987 Ebina et al. ......... 250/231.14
4,691,101 A * 9/1987 Leonard ............. 250/231.16
6,355,927 B1 * 3/2002 Snyder .............. 250/231.13
6,590,201 B2 * 7/2003 Ueda ................ 250/231.13
6,838,654 B2 * 1/2005 Kuo et al. ............ 250/214 A
6,966,623 B2 * 11/2005 Fo et al. .................. 347/19
7,002,137 B2 * 2/2006 Thorburn et al. ...... 250/231.13

FOREIGN PATENT DOCUMENTS

JP 2001-99684 4/2001

* cited by examiner

*Primary Examiner*—Georgia Epps
*Assistant Examiner*—Don Williams
(74) *Attorney, Agent, or Firm*—Nixon & Vanderhye P.C.

(57) ABSTRACT

An optical encoder comprising a light-receiving part having photodiodes equal in number to the common multiplier of a number of slits facing the light-receiving part and a number of movement information signals. Output terminals of the photodiodes are connected so that the movement information signals are respectively obtained by adding output signals of the plurality of photodiodes out of the photodiodes equal in number to the common multiplier. The twelve photodiodes are balancedly arranged corresponding to three slits and a light-receiving area of each photodiode is made smaller by subdiving each photodiode. The optical encoder suppress difference, distortion and variance of the movement information signals or the like obtained from the light-receiving part with the result that accurate movement information is obtained.

12 Claims, 11 Drawing Sheets

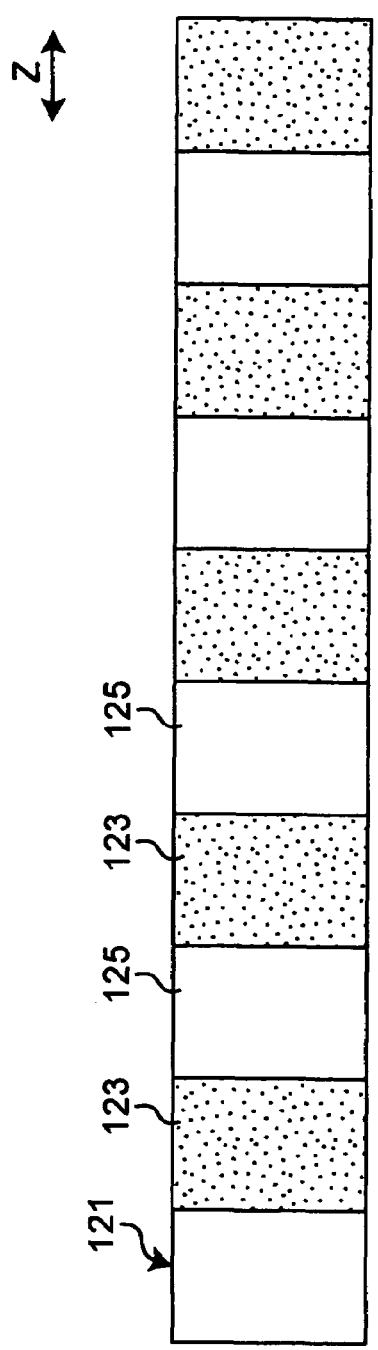
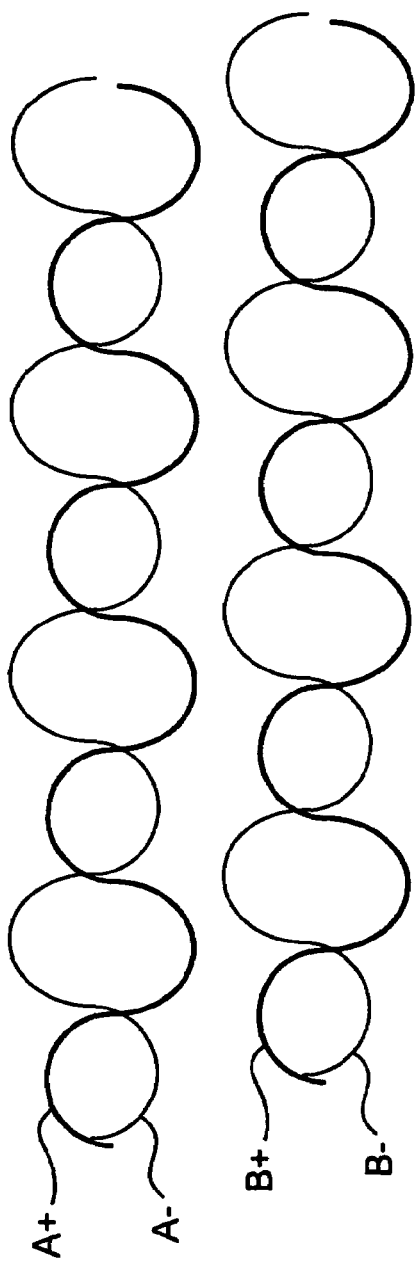
Fig.8A
Fig.8B
Fig.8C

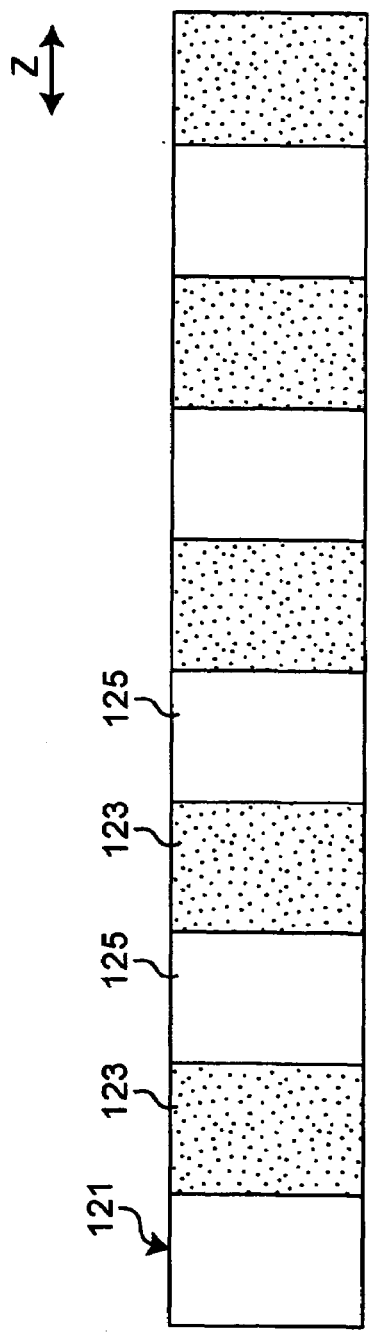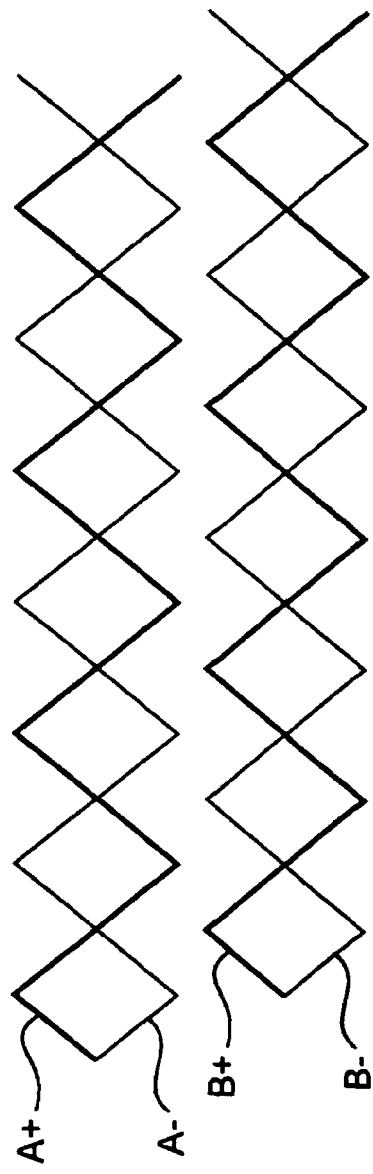
Fig.9A Fig.9B Fig.9C

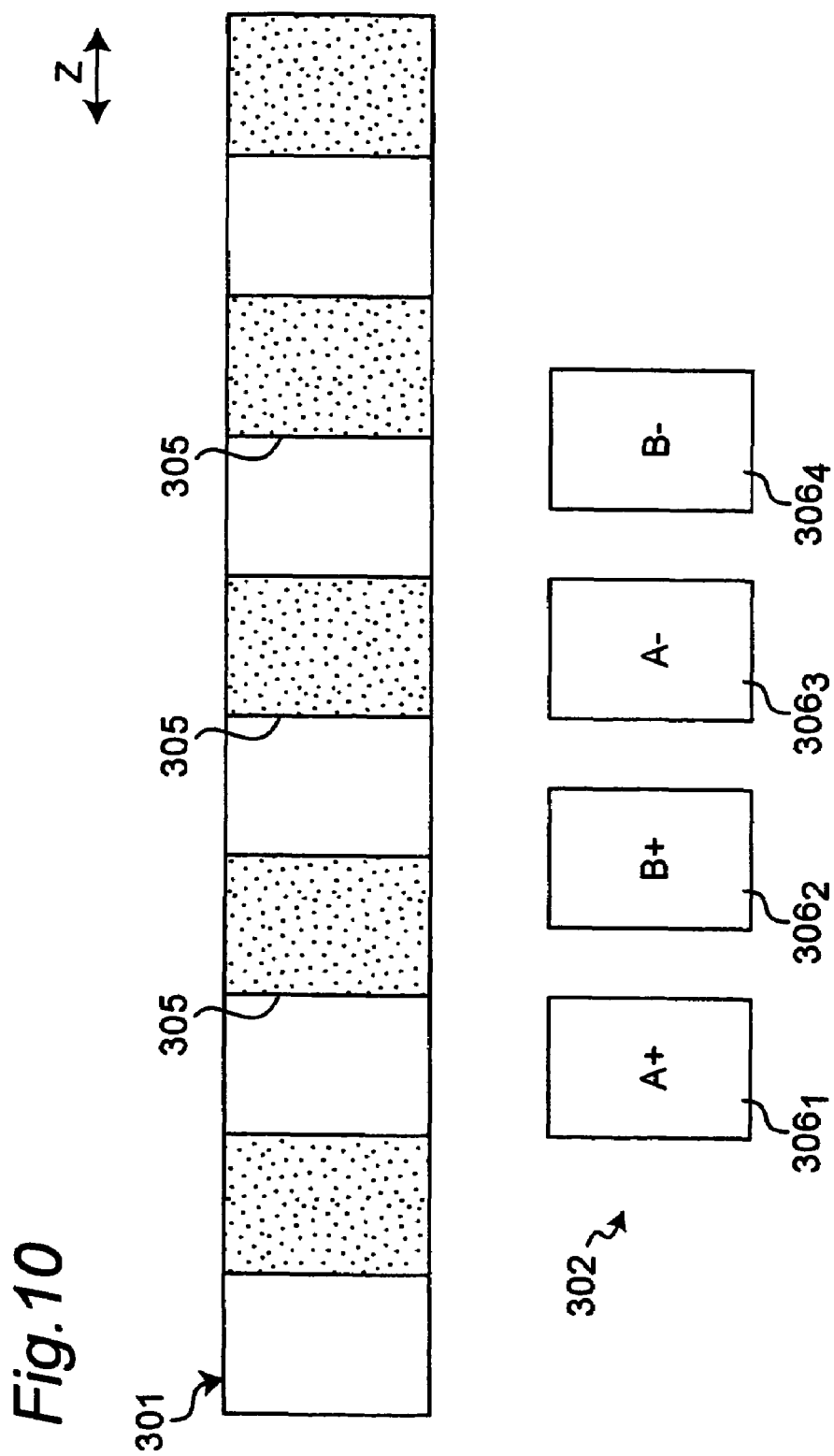

OPTICAL ENCODER

This Nonprovisional application claims priority under 35 U.S.C. §119(a) on Patent Application No. P2003-289817 filed in Japan on Aug. 8, 2003, the entire contents of which are hereby incorporated by reference.

BACKGROUND OF THE INVENTION

The present invention relates to optical encoders which detect a position, moving speed, and moving direction of a moving body using a photodiode as a photodetector, and more particularly to an optical encoder which is suitable for uses including printing apparatuses such as printers and copiers, and factory automation equipment by way of an example.

An example of a conventional optical encoder will be described by way of the optical encoder disclosed in JP 2001-99684 A.

As shown in FIG. 10, the optical encoder is provided with a light-emitting part (not shown) and a light-receiving part 302 across a moving body 301. The moving body 301 is provided with a plurality of slits 305 which are formed with a prescribed pitch and moves along a moving direction Z shown as arrow Z. The light-receiving part 302 receives lights which are emitted from the light-emitting part and transmitted through the slits 305 of the moving body 301. The light-receiving part 302 is provided with a plurality of photodiode groups, each of which is composed of four photodiodes $306_1$ to $306_4$. The photodiode groups arranged along the moving direction Z. The four photodiodes $306_1$ to $306_4$ face three slits 305 of the moving body 301.

When the moving body 301 moves along the moving direction Z relative to the light-emitting part and the light-receiving part 302, the light-receiving part 302 receives lights which are emitted from the light-emitting part and transmitted through the slits 305 and outputs four independent optical modulation signals, namely, movement signals A+, B+, A− and B− from four photodiodes $306_1$, $306_2$, $306_3$ and $306_4$, respectively.

When the optical encoder reads movement information of the moving body 301, the equal light quantity distribution on the light-receiving surface of the light-receiving part from a light source for the light-emitting part shown in property A of FIG. 7 is ideal. In this case, only the information of the moving body 301 is accurately read as an optical modulation signal.

In reality, however, lights which are incident on the light-receiving surface of the light-receiving part show a light quantity distribution like that in property B of FIG. 7. Examples of the reasons for this distribution are light quantity distribution variance from the light source itself; light quantity distribution variance caused by a converging lens of the light source; diffraction and refracted lights caused by a moving body or the like; irregularities in positional relationship caused by assembly irregularities such as parallelism of the moving body to the light-receiving surface; irregularities in the slit sizes of the moving body; irregularities in the light source, the moving body and the light-receiving surface caused by staining and the like; and light receiving sensitivity variance caused by the variation of the moving speed of the moving body.

Therefore, a plurality of the movement information signals obtained from the light-receiving part are subject to factors such as DC voltage offset between signals, amplitude fluctuation of signals, signal waveform distortion, and phase distortion among signals, so that the movement information obtained is made inaccurate.

SUMMARY OF THE INVENTION

Accordingly, an object of the present invention is to provide an optical encoder which suppresses factors such as difference, distortion and variance of the movement information signals obtained from the light-receiving part so as to obtain accurate movement information signals from a light-receiving part.

In order to achieve the above object, there is provided an optical encoder which comprises a moving body wherein light transmission areas and non-light transmission areas are alternately formed along a moving direction, a light-emitting part for emitting lights toward the moving body, and a light-receiving part for receiving lights emitted from the light-emitting part and transmitted through the light transmission areas and outputting movement information signals which represent the movement information of the moving body, wherein the light-receiving part which is arranged so as to face a plurality of the light transmission areas, outputs a plurality of the independent movement information signals and comprises photodiodes equal in number to a common multiplier of a number of the light transmission areas facing the light-receiving part and a number of the independent movement information signals; and output terminals of a plurality of the photodiodes are connected so that the plurality of the movement information signals are respectively obtained by adding output signals of the plurality of photodiodes out of the photodiodes equal in number to the common multiplier.

According to the optical encoder of the present invention, the light-receiving part is provided with photodiodes equal in number to the common multiplier of a number of the light transmission areas facing the light-receiving part and a number of the independent movement information signals. A plurality of output terminals of the photodiodes are connected so that a plurality of the movement information signals are respectively obtained by adding output signals of a plurality of photodiodes out of the photodiodes equal in number to the common multiplier.

Therefore, by arranging balancedly the common multiplier number of photodiodes corresponding to the light transmission areas and by subdiving each photodiode, a light-receiving area of each photodiode is made smaller, as compared with the case in which the light-receiving part has the same number of photodiodes as the number of movement information signals. As a result, factors such as difference, distortion and variance of the movement information signals obtained from the light-receiving part are suppressed and the resolution of the optical encoder is improved with the result that accurate movement information is obtained.

In one embodiment of the present invention, a size of the light transmission area of the moving body in a widthwise direction orthogonal to the moving direction and a size of the photodiode in the widthwise direction are made equal.

According to the present embodiment, the light quantity which each photodiode receives from each light transmission area is increased to maximum, with the result that the light receiving sensitivity is improved.

In one embodiment of the present invention, the photodiodes equal in number to the common multiplier have same sizes along the moving direction; and each of the movement information signals is outputted by adding output signals of the photodiodes of a number which is obtained by dividing the common multiplier by a number of the independent movement information signals.

In the present embodiment, since the total area of the photodiodes corresponding to each movement information signal is equal to the area of the light-receiving surfaces corresponding to each movement information signal, the balance among movement information signals is maintained with the result that accurate movement information is obtained.

In one embodiment of the present invention, the optical encoder further comprises a plurality of the light-receiving parts having the photodiodes equal in number to the common multiplier. In the present embodiment, a plurality of movement information signals are outputted from each of the light-receiving parts, with the result that more accurate movement information is obtained.

In one embodiment of the present invention, the photodiodes provided for the light-receiving part are arranged along the moving direction; and the plurality of the light-receiving parts are arranged along the widthwise direction. In the present embodiment, the photodiodes are arranged in two directions, namely, the moving direction and the widthwise direction, with the result that the accuracy of movement information is further improved.

In one embodiment of the present invention, at least two light-receiving parts of the plurality of the light-receiving parts, wherein arrangement orders of the plurality of photodiodes for obtaining each of the movement information signals are different from each other.

In the present embodiment, the light quantity distribution variance to the photodiodes for obtaining each movement information signal is suppressed with the result that dispersion among movement information signals is suppressed.

In one embodiment of the present invention, a number of the light transmission areas facing each of the light-receiving parts is three, a number of the independent movement information signals is four, and each of the light-receiving parts comprises 12 photodiodes;

when the moving direction of the moving body is considered as a longitudinal direction and an arrangement pitch in the light transmission area is considered as one pitch, the 12 photodiodes are arranged along the longitudinal direction, having a length equal to one-sixth of the pitch respectively;

each of the light-receiving parts comprises three photodiode groups, each of which is composed of the four photodiodes, distance between each of the photodiodes in each of the photodiode groups is $1/12$ of the pitch, in two adjacent photodiode groups, a photodiode in one photodiode group closest to the other photodiode group and a photodiode in the other photodiode group closet to the one photodiode group are adjoined at a pitch $5/12$ of the pitch; and four photodiodes in each of the photodiode groups respectively output output signals corresponding to four independent different movement information signals, and output one movement information signal by adding output signals of the three photodiodes corresponding to one movement information signal out of four movement information signals outputted from the three photodiode groups.

According to the present embodiment, each light-receiving part is provided with 12 photodiodes corresponding to three light transmission areas. Each of four movement information signals is obtained by adding the output signals from three photodiodes. Thus, by balancedly arranging the 12 photodiodes corresponding to the light transmission areas and by subdividing each photodiode, factors such as difference, distortion and variance of the movement information signals obtained from the light-receiving part are suppressed and the resolution of the optical encoder is improved with the result that accurate movement information is obtained.

In one embodiment of the present invention, four photodiodes of the three photodiode groups provided for each of the light-receiving parts comprises a first photodiode for outputting an output signal corresponding to a first movement information signal, a second photodiode for outputting an output signal corresponding to a second movement information signal, a third photodiode for outputting an output signal corresponding to a third movement information signal and a fourth photodiode for outputting an output signal corresponding to a fourth movement information signal; and in each of the three photodiode groups in one light-receiving part out of two adjacent light-receiving parts, the first photodiode, the second photodiode, the third photodiode and the fourth photodiode are arranged along the moving direction in order, and in each of the three photodiode groups of the other light-receiving part out of two adjacent light-receiving parts, the third photodiode, the fourth photodiode, the first photodiode and the second photodiode are arranged along the moving direction in order.

According to the present embodiment, since the arrangement order of photodiodes corresponding to movement information signals is changed in the two adjacent light-receiving parts, the light quantity distribution variance to the photodiodes for obtaining each movement information signal is suppressed with the result that dispersion among movement information signals is suppressed.

In one embodiment of the present invention, a number of the light transmission areas facing the light-receiving part is three, a number of the independent movement information signals is four, and the light-receiving part comprises 24 photodiodes;

when the moving direction of the moving body is considered as a longitudinal direction and an arrangement pitch in the light transmission area is considered as one pitch, the 24 photodiodes are arranged along the longitudinal direction, having a length equal to $1/12$ of the pitch respectively;

the light-receiving part comprises eight photodiode groups each of which is composed of the three photodiodes, and the three photodiodes in each of the photodiode groups arranged at a pitch $1/12$ of the pitch;

the eight photodiode groups is composed of the first to the eighth photodiode groups arranged along the moving direction in order;

a pitch between the first photodiode group and the second photodiode group, a pitch between the third photodiode group and the fourth photodiode group, a pitch between the fifth photodiode group and the sixth photodiode group and a pitch between the seventh photodiode group and the eighth photodiode group are $1/12$ of the pitch;

a pitch between the second photodiode group and the third photodiode group, a pitch between the fourth photodiode group and the fifth photodiode group, and a pitch between the sixth photodiode group and the seventh photodiode group are one-sixth of the pitch; and three photodiodes in each of the photodiode groups respectively output output signals corresponding to different movement information signals from one another, and output one movement information signal by adding output signals of six photodiodes corresponding to one movement information signal out of four movement information signals outputted from the eight photodiode groups.

According to the present embodiment, the light-receiving part is provided with 24 photodiodes corresponding to three light transmission areas. Each of four movement information signals is obtained by adding output signals from six photodiodes. Thus, by balancedly arranging the 24 photodiodes corresponding to the light transmission areas and by subdiving each photodiode, factors such as difference, distortion and variance of the movement information signals obtained from the light-receiving part are suppressed and the resolution of the optical encoder is improved with the result that accurate movement information is obtained.

In one embodiment of the present invention, a number of the light transmission areas facing the light-receiving part is two, a number of the independent movement information signals is four, and the light-receiving part comprises eight photodiodes;

when the moving direction of the moving body is considered as a longitudinal direction and an arrangement pitch in the light transmission area is considered as one pitch, the eight photodiodes are arranged along the longitudinal direction, having a length equal to a quarter of the pitch respectively;

the light-receiving part comprises two photodiode groups each of which is composed of the four photodiodes, and the four photodiodes in each of the photodiode groups arranged at a ¼ of the pitch;

in two adjacent photodiode groups, a photodiode in one photodiode group closest to the other photodiode group and a photodiode in the other photodiode group closet to the one photodiode group are adjoined at a half of the pitch;

four photodiodes in each of the photodiode groups respectively output output signals corresponding to four independent different movement information signals, and output one movement information signal by adding output signals of two photodiodes corresponding to one movement information signal out of four movement information signals outputted from the two photodiode groups.

According to the present embodiment, the light-receiving part is provided with eight photodiodes corresponding to two light transmitting areas. Each of four movement information signals is obtained by adding output signals from two photodiodes. Thus, by balancedly arranging the eight photodiodes corresponding to the light transmission areas and by subdiving each photodiode, factors such as difference, distortion and variance of the movement information signals obtained from the light-receiving part are suppressed and the resolution of the optical encoder is improved with the result that accurate movement information is obtained.

In one embodiment of the present invention, four photodiodes of the two photodiode groups provided for each of the light-receiving parts are composed of a first photodiode for outputting an output signal corresponding to a first movement information signal, a second photodiode for outputting an output signal corresponding to a second movement information signal, a third photodiode for outputting an output signal corresponding to a third movement information signal and a fourth photodiode for outputting an output signal corresponding to a fourth movement information signal; and in each of the two photodiode groups of one light-receiving part out of two adjacent light-receiving parts, the first photodiode, the second photodiode, the third photodiode and the fourth photodiode are arranged along the moving direction in order, and in each of the two photodiode groups of the other light-receiving part out of two adjacent light-receiving parts, the third photodiode, the fourth photodiode, the first photodiode and the second photodiode are arranged along the moving direction in order.

According to the present embodiment, since the arrangement order of photodiodes corresponding to movement information signals is changed in the two adjacent light-receiving parts, the light quantity distribution variance to the photodiodes for obtaining each movement information signal is suppressed with the result that dispersion among movement information signals is suppressed.

In one embodiment of the present invention, the moving body is of disk shape wherein light transmission areas of sectorial shape and non-light transmission areas of sectorial shape are circumferentially and alternately formed, and the moving direction is circumferential;

a profile of the photodiodes provided for the light-receiving part is made sectorial shape so as to be matched with the light transmission areas of sectorial shape.

According to the present embodiment, the optical encoder is provided with the light-receiving part having photodiodes of sectorial shape, facing light transmission areas of sectorial shape, which are provided for the moving body of disk shape moving circumferentially. As a result, the movement information signals of the moving body are effectively obtained.

In one embodiment of the present invention, additional photodiodes for detecting information other than movement information of the moving body are arranged between the photodiodes provided for the light-receiving part.

According to the present embodiment, information other than the movement information is obtained using signals outputted from additional photodiodes.

In one embodiment of the present invention, the additional photodiodes for detecting information other than movement information of the moving body are arranged between the photodiodes provided for the light-receiving part, and movement information is obtained by adding output signals of the additional photodiodes to output signals outputted from the photodiodes provided for the light-receiving part.

According to the present embodiment, the additional photodiodes provided for the optical encoder make it possible to correct the movement information using the output signals outputted from the additional photodiodes.

In one embodiment of the present invention, a plurality of photodiodes provided for the light-receiving part are formed on a semiconductor chip; and cross under resistors under wiring for electrically connecting the plurality of the photodiodes are provided which are intersected with the wiring, and the cross under resistors are made by impurity diffusion in the semiconductor chip.

According to the present embodiment, the optical encoder is provided with a cross under resistor made by impurity diffusion, which prevents the wiring from electrically connecting with photodiodes not intended to be electrically connected, and desired photodiodes can be electrically connected with each other via the wiring.

In one embodiment of the present invention, a device includes the above optical encoder. Thus, the movement information signals which accurately represent the movement information of the moving body are obtained.

According to the optical encoder of the present invention, the light-receiving part is provided with photodiodes equal in number to the common multiplier of a number of light transmission areas facing the light-receiving part and a number of the independent movement information signals. The plurality of the output terminals of the photodiodes are connected so that the plurality of the movement information signals are respectively obtained by adding the output signals of the plurality of the photodiodes out of the photodiodes equal in number to the common multiplier. Therefore, by arranging balancedly the common multiplier number of photodiodes corresponding to the light transmission areas and by subdiving each photodiode, a light-receiving area of each photodiode is made smaller, as compared with the case in which the light-receiving part has the same number of photodiodes as the number of movement information signals. As a result, factors such as difference, distortion and variance of the movement information signals obtained from the light-receiving part are suppressed and the resolution of the optical encoder is improved with the result that accurate movement information is obtained.

Accordingly, as shown in this present invention, by subdividing a photodiode as a photodetector, the balance among each of the movement information signals is made better by means of arranging a plurality of photodiodes corresponding to a plurality of movement information signals in various locations. Thus, this good balance advantageously reduces variance of each optical encoder product. As shown in the present invention, by subdividing a photodiode as a photodetector, the resolution of the optical encoder is advantageously improved.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 schematically shows a moving body of the optical encoder and an ideal property A and actual property B of the light quantity distribution which is given to a light-receiving part as the moving body is passing by;

FIG. 8A shows a moving body 121 of the second embodiment. FIG. 8B shows signal waveforms of movement information signals A+ and A− in a comparative example of the second embodiment. FIG. 8C shows signal waveforms of movement information signals B+ and B− in the comparative example of the second embodiment;

FIG. 9A shows a moving body 121 of the second embodiment. FIG. 9B shows signal waveforms of movement information signals A+ and A− in a comparative example of the second embodiment. FIG. 9C shows signal waveforms of movement information signals B+ and B− in the comparative example of the second embodiment;

FIG. 10 schematically shows a conventional optical encoder; and

DETAILED DESCRIPTION OF THE PREFERRED EMBODIMENTS

This invention will be described in further detail by way of preferred embodiments with reference to the accompanying drawings.

First Embodiment

Figure 1:
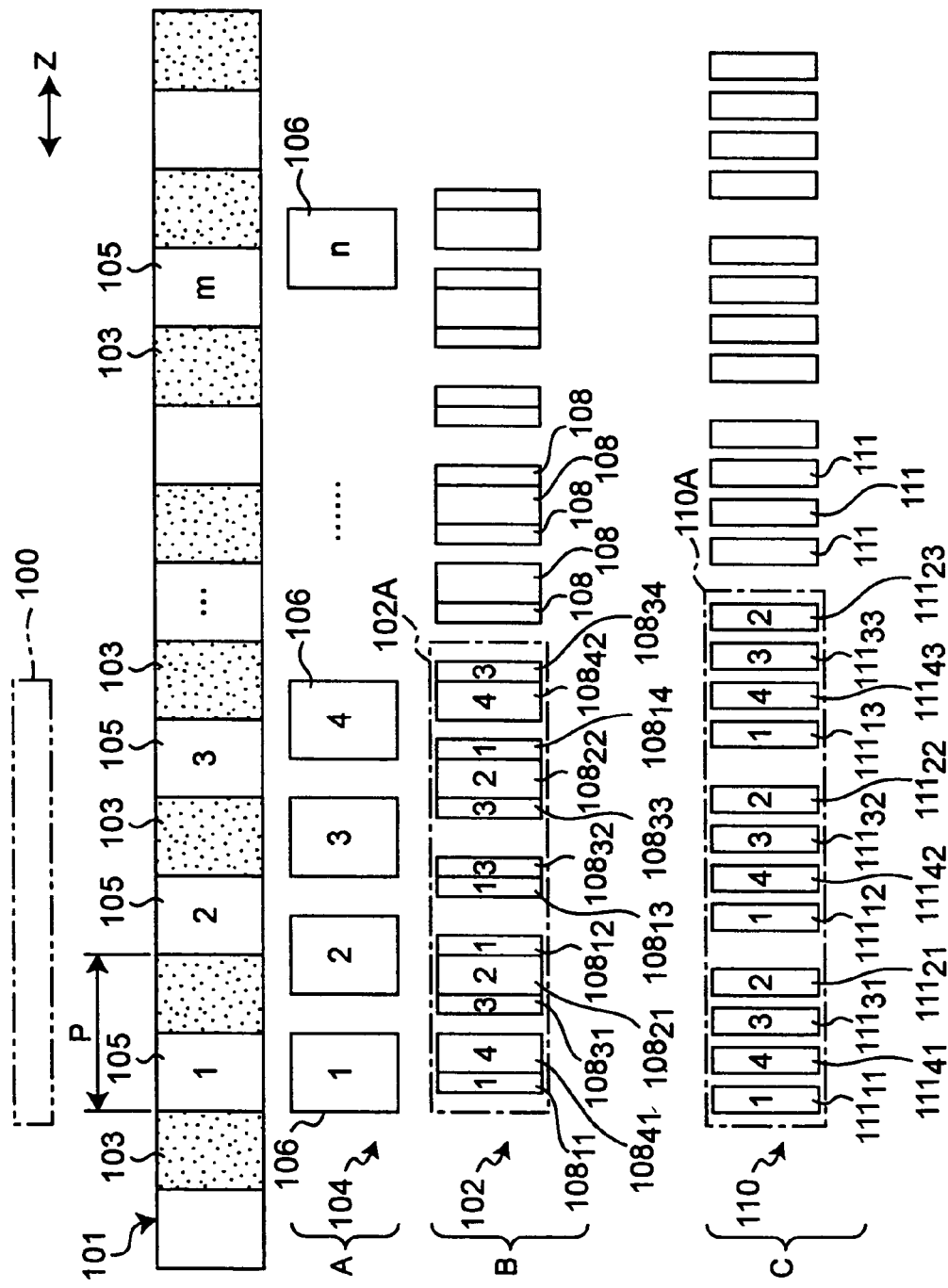
FIG. 1 schematically shows a first embodiment of the optical encoder according to the present invention.

FIG. 1 shows a first embodiment of the optical encoder according to the present invention.

The optical encoder of the first embodiment includes a moving body 101, a light-emitting part 100 and a light-receiving part 102 shown in region B of FIG. 1. The light-emitting part 100 and the light-receiving part 102 are arranged so as to face each other across the moving body 101. By way of an example, the light-emitting part 100 is composed of components such as a light-emitting diode.

The moving body 101 is provided with slits 105, which are formed with a prescribed pitch P as a plurality of light transmission areas. The moving body 101 moves, relative to the light-emitting part 100 and the light-receiving part 102, along the direction in which the plurality of the slits 105 are arranged. Lights emitted from the light-emitting part are transmitted through the slits 105 of the moving body 101 toward the light-receiving part 102, but are blocked off by parts 103 which are arranged between the slits 105 as non-light transmission areas. The moving body 101 moves along a moving direction Z shown in FIG. 1.

In the first embodiment, an optical encoder is provided with the light-receiving part 102 shown in region B of FIG. 1 instead of the light-receiving part 104 shown in region A of FIG. 1 as a comparative example.

First, the comparative example is described. The light-receiving part 104 of the comparative example is composed of (n) photodiodes 106 with a light-receiving surface having a length equal to one-half of the pitch P. The photodiodes 106 are arranged along the moving direction Z at intervals of one-fourth of the pitch P ((n) represents a positive integer). The above mentioned length denotes a size of the light-receiving surface in the moving direction Z. By way of example, the light-receiving part 104 is formed on one semiconductor chip. In the light-receiving part 104, an output signal is independently taken from each of the photodiodes 106 according to a light quantity received from the light-emitting part through the moving body 101. Namely, the light-receiving part 104 obtains (n) independent output signals, which are movement information signals, from (n) photodiodes 106 facing the (m) slits 105 ((m) represents a positive integer).

On the other hand, the light-receiving part 102 provided for the optical encoder of the present embodiment, as shown in region B of FIG. 1, is composed of (k) photodiodes 108 arranged along the moving direction ((k) represents a common multiplier of the (n) and the (m)). By way of example, the light-receiving part 102 is formed on one semiconductor chip. The light-receiving part 102 faces the (m) slits 105. Namely, the light-receiving part 102 is provided with (k)/(n) times as many photodiodes 108 as the photodiodes provided for the light-receiving part 104 of the comparative example. The output terminals of the (k) photodiodes 108 are connected to one another so as to obtain (n) independent output signals, which are movement information signals, from the light-receiving part 102.

The connections among the output terminals is now described. In the above example in which the following values are assigned: n=4, m=3, k=12, the light-receiving part 102 corresponds to a light-receiving part 102A, which is boxed with a dashed line in FIG. 1. The light-receiving part 102A is composed of 12 photodiodes 108. Among the 12 photodiodes 108, output terminals of four photodiodes $108_{11}$, $108_{12}$, $108_{13}$ and $108_{14}$ are commonly connected, and output terminals of two photodiodes $108_{21}$ and $108_{22}$ are commonly connected. Also, output terminals of four photodiodes $108_{31}$, $108_{32}$, $108_{33}$ and $108_{34}$ are commonly connected, and output terminals of two photodiodes $108_{41}$ and $108_{42}$ are commonly connected.

In the light-receiving part 102A, a first movement information signal is obtained by adding the output signals from the output terminals of the four photodiodes $108_{11}$ to $108_{14}$, and a second movement information signal is obtained by adding the output signals from the output terminals of the two photodiodes $108_{21}$ and $108_{22}$. Also, a third movement information signal is obtained by adding the output signals from the output terminals of the four photodiodes $108_{31}$ to $108_{34}$, and a fourth movement information signal is obtained by adding the output signals from the output terminals of the two photodiodes $108_{41}$ and $108_{42}$.

As shown in region B of FIG. 1, the photodiodes $108_{11}$ to $108_{14}$ have a light-receiving surface with a length equal to one-eighth of the pitch P, and the photodiodes $108_{21}$ and $108_{22}$ have a light-receiving surface with a length equal to one-fourth of the pitch P. Also, the photodiodes $108_{31}$ to $108_{34}$ have a light-receiving surface with a length equal to one-eighth of the pitch P, and the photodiodes $108_{41}$ and $108_{42}$ have a light-receiving surface with a length equal to one-fourth of the pitch P. The above mentioned length denotes a size of the light-receiving surface in the moving direction Z of the moving body 101.

According to the first embodiment, the light-receiving part 102 is composed of (k) photodiodes 108 ((k) represented a common multiplier of (n) and (m)), so as to obtain (n) independent movement information signals from the light-receiving part 102 which faces (m) slits 105 of the moving body 1, when the moving body 1 moves along the moving direction Z. The output terminals of the (k) photodiodes 108 is connected so that the light-receiving part 102 outputs (n) independent movement information signals.

Namely, according to the optical encoder of the first embodiment, (n) photodiodes 106 of the light-receiving part 104 in the comparative example shown in region A of FIG. 1 are divided into (k) photodiodes so that (n) independent movement information signals are obtained from (k) output signals of the (k) photodiodes 108. By increasing the number of photodiodes (n) to (k) for the same number (m) of slits, dispersion among (n) independent movement information signals obtained from the light-receiving part 102 can be further reduced, as compared with dispersion among the (n) independent movement information signals obtained from the light-receiving part 104.

Distance between each of the photodiodes 108 is made smaller by increasing the number of the photodiodes 108 (n) to (k) for the same number (m) of slits. Since a light-receiving area of each of the photodiodes 108 is made smaller, difference in light quantity is more sensitively detected.

Though the light-receiving part 102 is composed of (k: common multiplier of (n) and (m)) photodiodes 108 in the first embodiment, the light-receiving part 102 may be composed of the photodiodes 108 of a number which is larger than (n) but not (k).

When the light-receiving part is composed of the photodiodes 108 of (k), which is a common multiplier of (m) the number of slits and (n) the number of the movement information signal independently obtained, each of the photodiodes $108_{11}$ to $108_{14}$ and $108_{31}$ to $108_{34}$ can conform to the same shape, and each of the photodiodes $108_{41}$ and $108_{42}$ and the photodiodes $108_{21}$ and $108_{22}$ can conform to the same shape, for example the light-receiving part 102A shown in the area boxed with the dashed line in FIG. 1. Accordingly, the sum of light-receiving areas of the four photodiodes $108_{11}$ to $108_{14}$, the sum of light-receiving areas of the two photodiodes $108_{21}$ and $108_{22}$, the sum of light-receiving areas of the four photodiodes $108_{31}$ to $108_{34}$, and the sum of light-receiving areas of the two photodiodes $108_{41}$ and $108_{42}$ are all made equal. As a result, the signal balance among the first to the fourth independent signals is advantageously maintained.

In the present embodiment, the sizes (in the lengthwise direction and in the orthogonal direction) of each of the photodiodes 108 are made equal. As a result, when the normal direction of the light-receiving surface is in parallel with an optical axis of the light-emitting part, the light-receiving surface is in parallel with openings of the slits 105, and the light quantity distributed from the light-emitting part to each of the slits 105 corresponding to each of the photodiodes 108 is approximately uniform, then the balance among (n) movement information signals obtained from the light-receiving part 102 is maintained.

Also, the optical encoder may be provided with the light-receiving part 110 shown in region C of FIG. 1 instead of the light-receiving part 102 shown in region B of FIG. 1. The light-receiving part 110 is provided with (k) photodiodes 111, which are obtained by each of the photodiodes 106 provided for the light-receiving part 104 shown in region A being equally divided into (x) ((k) represents a common multiplier of (n): the number of movement information signals and (m): the number of slits, and (x) represents (k)/(n)). Accordingly, the length of the light-receiving surface each of the photodiodes 111 is one-(x)th of the length of the light-receiving surface of the photodiodes 106. The output terminals of each of the photodiodes 106 are connected so that the light-receiving part 110 having the (k) photodiodes 111 outputs (n) independent movement information signals.

In an example in which the following values are assigned: (m)=3, (n)=4, (k)=12, the light-receiving part 110 corresponds to a light-receiving part 110A and (x) the equal division number is 3, so that the light-receiving part 110A is provided with 12 photodiodes 111 which are obtained by each of the four photodiodes 106 being equally divided into three. Accordingly, the length of the light-receiving surface of the photodiodes 111 is one-third of the length of the light-receiving surface of the photodiodes 106. In FIG. 1, output terminals of three photodiodes $111_{11}$, $111_{12}$ and $111_{13}$ are commonly connected, and output terminals of three photodiodes $111_{41}$, $111_{42}$ and $111_{43}$ are commonly connected. Also, output terminals of three photodiodes $111_{31}$, $111_{32}$ and $111_{33}$ are commonly connected, and output terminals of three photodiodes $111_{21}$, $111_{22}$ and $111_{23}$ are commonly connected. The light-receiving part 110 outputs four independent movement information signals through the connections.

In the light-receiving part 110, the balance is maintained among all signals outputted from the output terminals of the photodiodes 111.

Figure 11A:
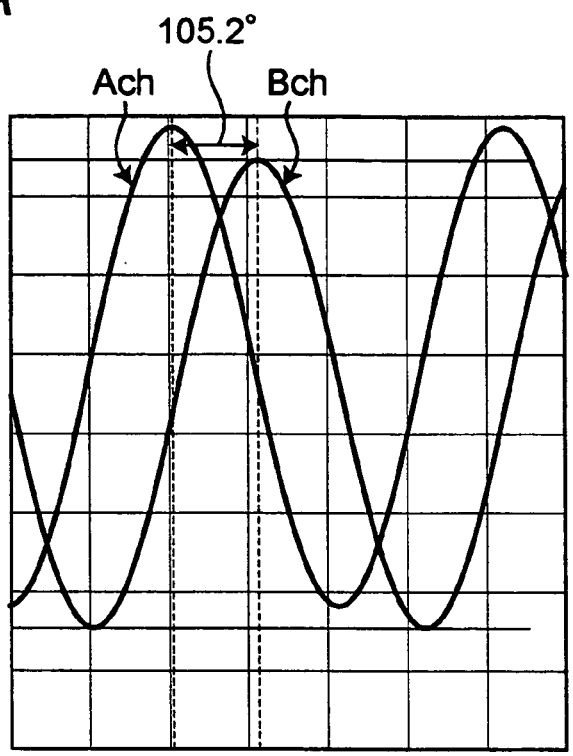
FIG. 11A is a waveform chart which shows a signal waveform Ach which is operationally compared between movement information signals A+ and A− outputted from the light-receiving part 104 shown in region A of FIG. 1 and amplified, and a signal waveform Bch which is operationally compared between movement information signals B+ and B− and amplified.

FIG. 11A shows a signal waveform Ach which is obtained by operationally comparing between movement information signals A+ and A− corresponding to the first and the third movement information signals out of the first to the fourth independent movement information signals outputted from the light-receiving part 104 of comparative example shown in region A of FIG. 1 and amplifying, and a signal waveform Bch which is obtained by operationally comparing between movement information signals B+ and B− corresponding to the second and the fourth movement information signals and amplifying. A phase difference between the signal waveforms Ach and Bch shown in FIG. 11A is 105.2 degrees, which is shifted approximately 15 degrees from the ideal phase difference of 90 degrees, and offset between channels is also large.

Figure 11B:
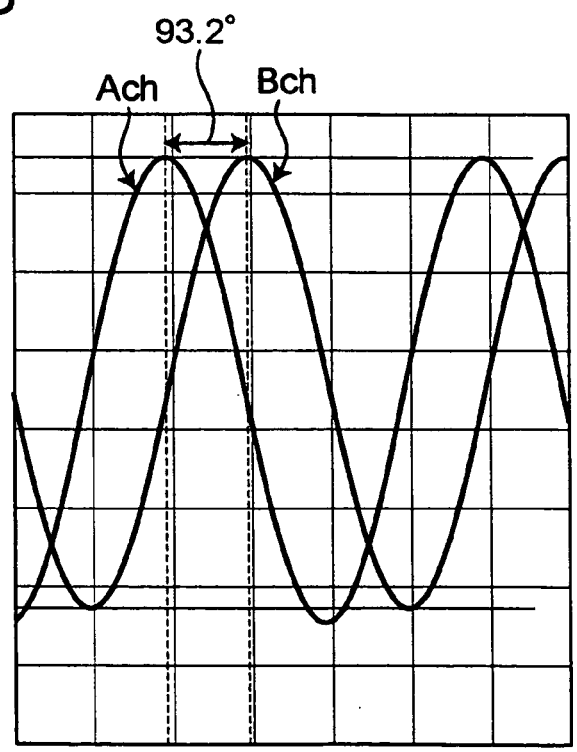
FIG. 11B is a waveform chart which shows a signal waveform Ach which is operationally compared between movement information signals A+ and A− outputted from the light-receiving part 110 shown in region C of FIG. 1 and amplified, and a signal waveform Bch which is operationally compared between movement information signals B+ and B− and amplified.

In contrast, FIG. 11B shows a signal waveform Ach which is obtained by operationally comparing between movement information signals A+ and A− corresponding to the first and the third movement information signals out of the first to the fourth independent movement information signals outputted from the light-receiving part 110 and amplifying, and a signal waveform Bch which is obtained by operationally comparing between movement information signals B+ and B− corresponding to the second and the fourth movement information signals and amplifying. A phase difference between the signal waveforms Ach and Bch in FIG. 11B is 93.2 degrees, which is shifted closer to the ideal phase difference of 90 degrees, and offset between channels is made smaller than the comparative example. Note that each of the numbers 1, 2, 3 and 4 written in the frame representing photodiodes in FIG. 1, represents each of the photodiodes corresponding to the first, the second, the third and the fourth movement information signals respectively.

In the first embodiment, a plurality of the light-receiving parts 102 or 110 may be arranged along the column direction (the moving direction of the moving body 101) and along the row direction (in a direction orthogonal to the moving direction) so as to improve photosensitivity. One example in this case will be described in the following second embodiment.

Second Embodiment

Figure 2:
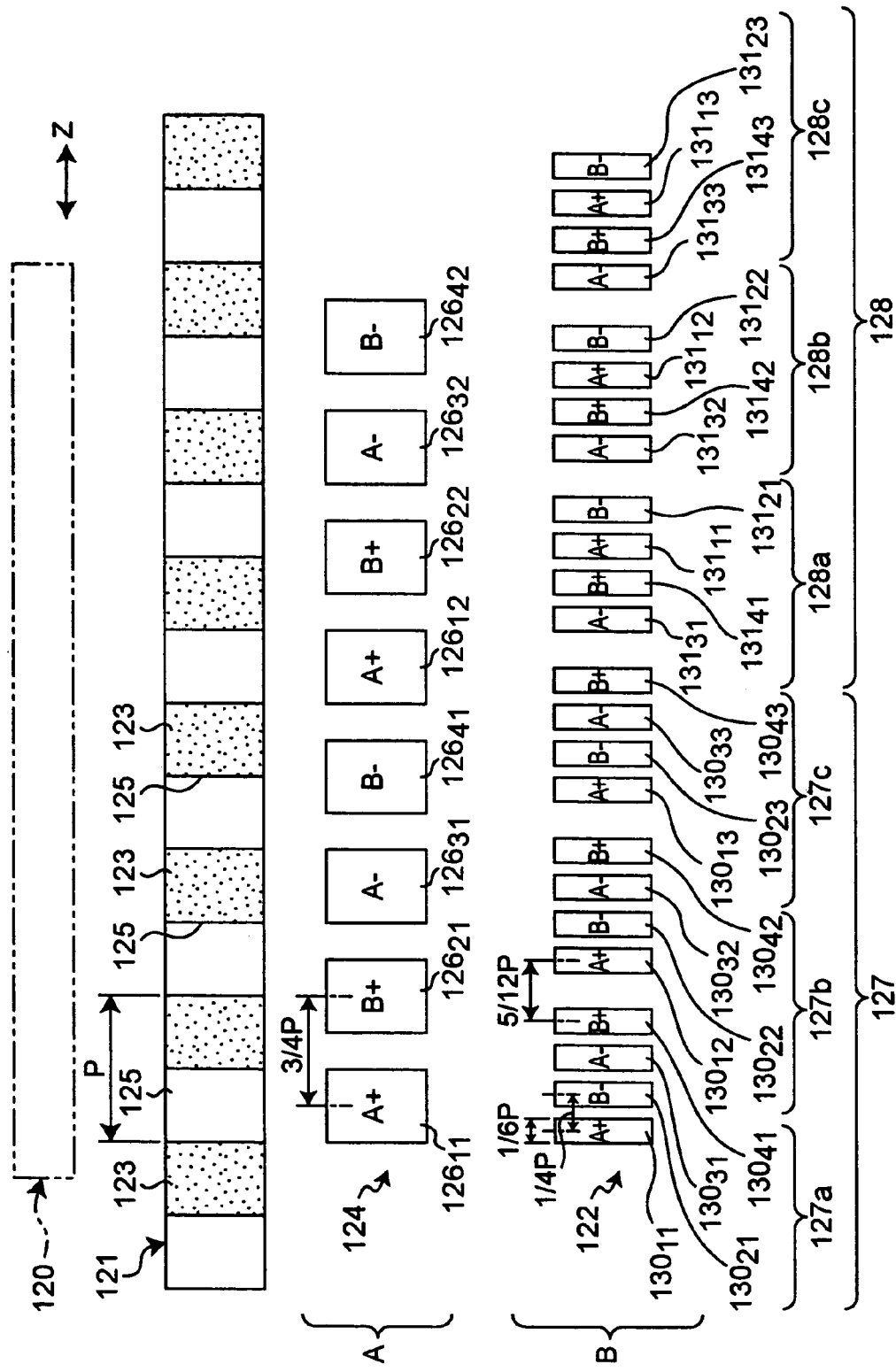
FIG. 2 schematically shows a second embodiment of the optical encoder according to the present invention.

Referring now to FIG. 2, there is shown a second embodiment of the optical encoder according to the present invention.

The optical encoder of the second embodiment includes a moving body 121 which is moving along a moving direction Z, a light-emitting part 120 and a light-receiving part 122 shown in region B of FIG. 2. The light-emitting part 120 and the light-receiving part 122 are arranged so as to face each other across the moving body 121. By way of an example, the light-emitting part 120 is composed of components such as a light-emitting diode.

The moving body 121, is provided with a plurality of slits 125 which are formed with a prescribed pitch P. The slits 125 function as light transmission areas. The moving body 121 moves relative to the light-emitting part 120 and the light receiving part 122, along a direction Z in which the plurality of slits 125 are arranged. Lights emitted from the light-emitting part are transmitted through the slits 125 of the moving body 121 toward the light-receiving part 122, but are blocked off by parts 123 between the slits 125 as non-light transmission areas. The parts 123 function as non-light transmission areas.

In the second embodiment, the optical encoder is provided with the light-receiving part 122 shown in region B of FIG. 2 instead of a light-receiving part 124 shown in region A of FIG. 2 as a comparative example. The light-receiving part 122 is provided with a first light-receiving part 127 and a second light-receiving part 128.

First, the comparative example is described. The light-receiving part 124 as the comparative example is provided with eight photodiodes $126_{11}$, $126_{21}$, $126_{31}$, $126_{41}$, $126_{12}$, $126_{22}$, $126_{32}$ and $126_{42}$. The eight photodiodes 126 are arranged along the moving direction Z at piches of three-fourths of the pitch P. Each of the photodiodes 126 has a light-receiving surface with a length equal to one-half of the pitch P. The length here denotes a size of the light-receiving surface in the moving direction Z. By way of example, the light-receiving part 124 is formed on one semiconductor chip. In the light-receiving part 124, output terminals of the photodiodes $126_{11}$ and $126_{12}$ are connected, and a first movement information signal A+ is outputted by adding the output signals from the photodiodes $126_{11}$ and $126_{12}$. Output terminals of the photodiodes $126_{21}$ and $126_{22}$ are connected, and a second movement information signal B+ is outputted by adding the output signals from the photodiodes $126_{21}$ and $126_{22}$. Output terminals of the photodiodes $126_{31}$ and $126_{32}$ are connected, and a third movement information signal A− is outputted by adding the output signals of the photodiodes $126_{31}$ and $126_{32}$. Output terminals of the photodiodes $126_{41}$ and $126_{42}$ are connected, and a fourth movement information signal B− is outputted by adding the output signals of the photodiodes $126_{41}$ and $126_{42}$.

On the other hand, the light-receiving part 122 of the second embodiment is provided with the first light-receiving part 127 and the second light-receiving part 128 as shown in region B of FIG. 2.

The first light-receiving part 127 is provided with 12 photodiodes 130, whose number is three times as many as four movement information signals to be taken out independently. Each of the photodiodes 130 has a length equal to one-sixth of the pitch P. Namely, each of the photodiodes 130 has a length equal to one-third of the length of the photodiodes 126. The first light-receiving part 127 is also provided with three photodiode groups 127a, 127b and 127c.

The photodiode group 127a is provided with four photodiodes $130_{11}$, $130_{21}$, $130_{31}$ and $130_{41}$. The four photodiodes $130_{11}$ to $130_{41}$ are arranged along the moving direction at the pitch being a quarter of the pitch P. The photodiode group 127b is provided with four photodiodes $130_{12}$, $130_{22}$, $130_{32}$ and $130_{42}$. The four photodiodes $130_{12}$ to $130_{42}$ are arranged along the moving direction at the pitch being a quarter of the pitch P. The photodiode group 127c is provided with four photodiodes $130_{13}$, $130_{23}$, $130_{33}$ and $130_{43}$. The four photodiodes $130_{13}$ to $130_{43}$ are arranged along the moving direction at the pitch being a quarter of the pitch P. The photodiodes $130_{41}$ and $130_{12}$ are arranged at the pitch being $5/12$ of the pitch P, and the photodiodes $130_{42}$ and $130_{13}$ are at the pitch being $5/12$ of the pitch P.

An output terminal of the photodiode $130_{11}$ of the photodiode group 127a, an output terminal of the photodiode $130_{12}$ of the photodiode group 127b and an output terminal of the photodiode $130_{13}$ of the photodiode group 127c are connected. Output terminals of the photodiodes $130_{21}$, $130_{22}$ and $130_{23}$ are connected. Output terminals of the photodiodes $130_{31}$, $130_{32}$ and $130_{33}$ are connected. Output terminals of the photodiodes $130_{41}$, $130_{42}$ and $130_{43}$ are connected.

Thus, in the first light-receiving part 127, a first movement information signal generated by adding the output signals of the three photodiodes $130_{11}$ to $130_{13}$ and a second movement information signal generated by adding the output signals of the three photodiodes $130_{21}$ to $130_{23}$ are obtained. A third movement information signal generated by adding the output signals of the three photodiodes $130_{31}$ to $130_{33}$ and a fourth movement information signal generated by adding the output signals of the three photodiodes $130_{41}$ to $130_{43}$ are also obtained.

The second light-receiving part 128 is provided with 12 photodiodes 131, whose number is three times as many as four movement information signals to be taken out independently. Each of the photodiodes 131 has a length equal to one-sixth of the pitch P. Accordingly each of the photodiodes 131 has a length equal to one-third of the length of the photodiodes 126. The second light-receiving part 128 is also provided with three photodiode groups 128a, 128b and 128c.

The photodiode group 128a is provided with four photodiodes $130_{31}$, $130_{41}$, $130_{11}$ and $130_{21}$. The four photodiodes $130_{31}$ to $130_{21}$ are arranged along the moving direction at the pitch being a quarter of the pitch P. The photodiode group 128b is provided with four photodiodes $130_{32}$, $130_{42}$, $130_{12}$ and $130_{22}$. The four photodiodes $130_{32}$ to $130_{22}$ are arranged along the moving direction at the pitch being a quarter of the pitch P. The photodiode group 128c is provided with four photodiodes $130_{33}$, $130_{43}$, $130_{13}$ and $130_{23}$. The four photodiodes $130_{33}$ to $130_{23}$ are arranged along the moving direction at the pitch being a quarter of the pitch P. The photodiodes $130_{21}$ and $130_{32}$ are arranged at the pitch being $5/12$ of the pitch P, and the photodiodes $130_{22}$ and $130_{33}$ are arranged at the pitch being $5/12$ of the pitch P.

An output terminal of the photodiode $131_{11}$ of the photodiode group 128a, an output terminal of the photodiode $131_{12}$ of the photodiode group 128b and an output terminal of the photodiode $131_{13}$ of the photodiode group 128c are connected. Output terminals of the photodiodes $131_{21}$, $131_{22}$ and $131_{23}$ are connected. Output terminals of the photodiodes $131_{31}$, $131_{32}$ and $130_{33}$ are connected. Output terminals of the photodiodes $131_{41}$, $131_{42}$ and $131_{43}$ are also connected.

Thus, in the second light-receiving part 128, a first movement information signal A+ which is added by the output signals of the three photodiodes $131_{11}$ to $130_{13}$ and a second movement information signal B− which is added by the output signals of the three photodiodes $131_{21}$ to $131_{23}$ are obtained. A third movement information signal A− which is added by the output signals of the three photodiodes $131_{31}$ to $131_{33}$ and a fourth movement information signal B+ which is added by the output signals of the three photodiodes $131_{41}$ to $131_{43}$ are also obtained.

Wiring is connected so that the first movement information signal A+ in the first light-receiving part 127 and the first movement information signal A+ in the second light-receiving part 128 are added. A first movement information signal A+ of the light-receiving part 122 is outputted by adding the two first movement information signals A+. In a similar process, a second movement information signals B− of the light-receiving part 122 is outputted by adding the second movement information signal B− in the first light-receiving part 127 and the second movement information signal B− in the second light-receiving part 128 are added. A third movement information signal A− of the light-receiving part 122 is outputted by adding the third movement information signal A− in the first light-receiving part 127 and the third movement information signal A− in the second light-receiving part 128. A fourth movement information signal B+ of the light-receiving part 122 is outputted by adding the fourth movement information signal B+ in the first light-receiving part 127 and the fourth movement information signal B+ in the second light-receiving part 128.

Referring now to FIG. 8, signal waveforms of the four movement information signals A+, A−, B+ and B− are illustrated which are outputted from the light-receiving part 124 in the comparative example when the moving body 121 moves along the moving direction Z. FIG. 8A shows the moving body 121. FIG. 8B shows signal waveforms of the movement information signals A+ and A−. FIG. 8C shows signal waveforms of the movement information signals B+ and B−. Although the phases of the movement information signal A+ and the movement information signal A− should be inverted to each other precisely at 180°, the phases of the movement information signal A+ and the movement information signal A− are not inverted precisely at 180°, with the result that phase shift is generated as shown in FIG. 8B. Although the movement information signals B+ and B− should be shifted relative to the movement information signal A+ at 90° and 270° respectively, phase shifts from optimum phases are generated as shown in FIG. 8C. The phase shifts are generated due to a large dispersion among signals outputted from each of the photodiodes 126. The amplitudes among the movement information signals are also fluctuated due to the above dispersion, with the result that offset of each movement information signal is generated. Since the resolution of the movement information obtained by each of the photodiodes 126 is low, a signal waveform of each movement information signal is deformed.

In contrast, the light-receiving part 122 of the second embodiment is provided with photodiodes 130 and 131 into which the photodiode 126 in the light-receiving part 124 in the comparative example are subdivided. In the light-receiving part 122, the phase difference between a signal waveform of the movement information signal A+ and a signal waveform of the movement information signal A− is precisely 180° as shown in FIG. 9B. The movement information signal B+ is made into phase difference precisely at 90° to the movement information signal A+, and the movement information signal B− is made into phase difference precisely at 270° to the movement information signal A+ as shown in FIG. 9C. In the light-receiving part 122, fluctuation in amplitude and offset among the movement information signals practically disappeared. In addition, a trapezoidal wave is obtained as a signal waveform of each movement information signal, with the result that a highly exact signal processing is conducted. Therefore, highly exact movement information is obtained.

In the second embodiment, the arrangement orders of photodiodes corresponding each of the movement information signals (A+, B−, A− and B+) are varied between the first light-receiving part 127 and the second light-receiving part 128 as shown in region B of FIG. 2. Specifically, in each of the photodiode groups 127a to 127c of the first light-receiving part 127, a photodiode corresponding to the first movement information signal A+, a photodiode corresponding to the second movement information signal B−, a photodiode corresponding to the third movement information signal A− and a photodiode corresponding to the fourth movement information signal B+ are arranged in order. In each of the photodiode groups 128a to 128c of the second light-receiving part 128, a photodiode corresponding to the third movement information signal A−, a photodiode corresponding to the fourth movement information signal B+, a photodiode corresponding to the first movement information signal A+ and a photodiode corresponding to the second movement information signal B− are arranged in order. The arrangement orders of photodiodes corresponding each of the movement information signals (A+, B−, A− and B+) are thus varied between the first light-receiving part 127 and the second light-receiving part 128, so that the light quantity variance distributed to each photodiodes is suppressed with the result that dispersions of light quantity balance or the like are suppressed.

A third light-receiving part which has the same constitution as the first light-receiving part 127 may be arranged on the right neighbor of the second light-receiving part 128, and a fourth light-receiving part which has the same constitution as the second light-receiving part 128 may be further arranged on the right neighbor of the third light-receiving part. In a similar manner, a prescribed number of light-receiving parts which have the same constitutions as the first light-receiving part 127 and the second light-receiving part 128 may be alternately arranged.

Third Embodiment

Figure 3:
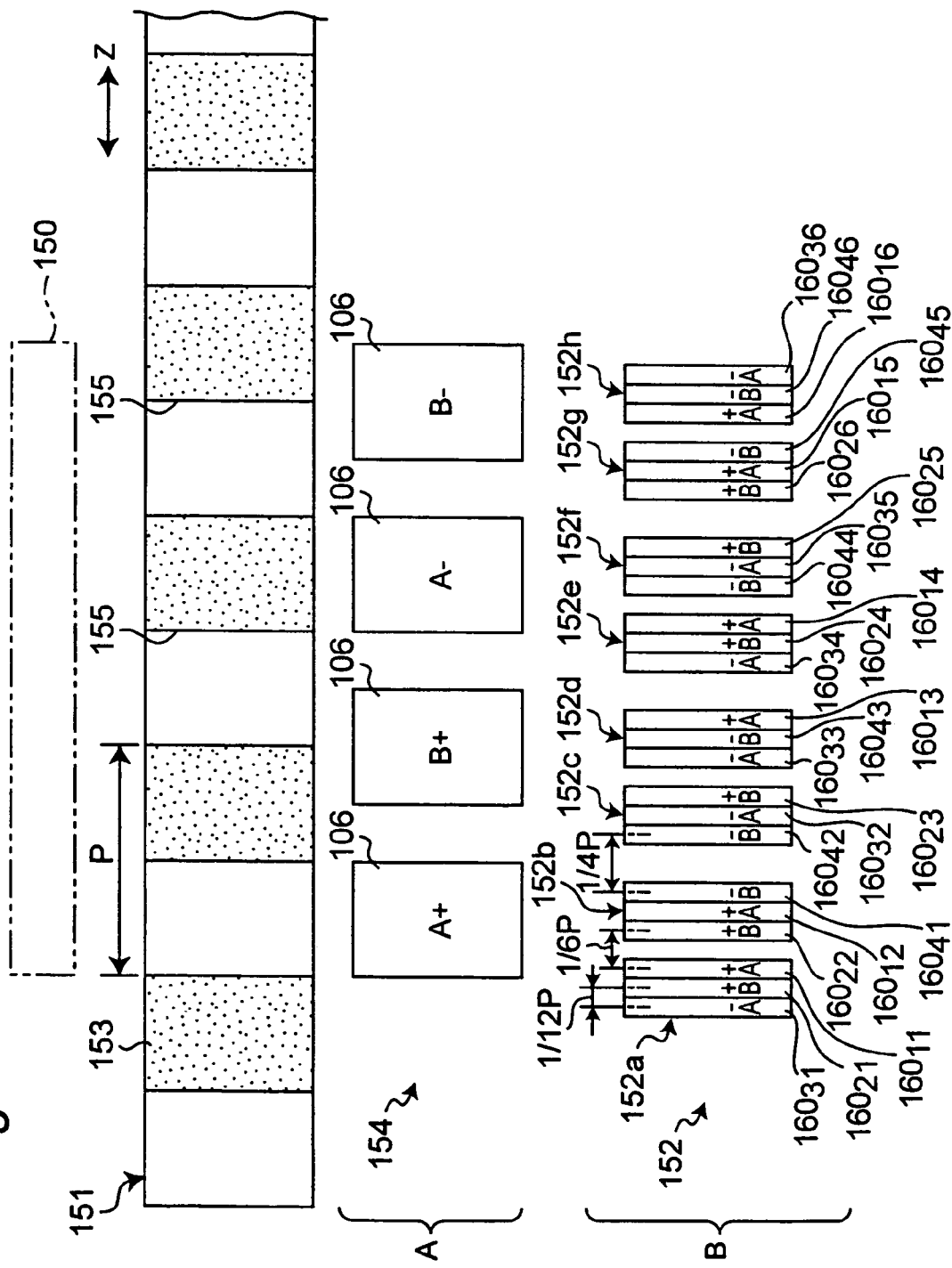
FIG. 3 schematically shows a third embodiment of the optical encoder according to the present invention.

Referring now to FIG. 3, there is shown a third embodiment of the optical encoder according to the present invention. In the third embodiment, the optical encoder is provided with a light-emitting part 150, a light-receiving part 152 shown in region B of FIG. 3 and a moving body 151 which moves along a moving direction Z relative to the light-emitting part 150 and the light-receiving part 152. The light-emitting part 150 and the light-receiving part 152 are arranged so as to face each other across the moving body 151. By way of an example, the light-emitting part 150 is composed of components such as a light-emitting diode.

The moving body 151 is provided with a plurality of slits 155 which are formed with a prescribed pitch P. The slits 155 function as light transmission areas. The moving body 151 moves along the direction Z in which the plurality of the slits 155 are arranged. Lights emitted from the light-emitting part are transmitted through the slits 155 of the moving body 151 toward the light-receiving part 152, but the lights are blocked off by parts 153 between the slits 155. The parts 153 function as non-light transmission areas. The moving body 151 has the same constitution as the moving body 101 shown in FIG. 1.

In the third embodiment, the optical encoder is provided with the light-receiving part 152 shown in region B of FIG. 3 instead of a light-receiving part 154 shown in region B of FIG. 3 as a comparative example. The light-receiving part 154 as the comparative example is provided with photodiodes 106 which are the first to the fourth photodiodes from the left in the light-receiving part 104 shown in region A of FIG. 1.

As shown in region B of FIG. 3, the light-receiving part 152 provided for the optical encoder of the present embodiment outputs corresponding to three slits 155 four independent movement signals, namely, a first movement information signal A+, a second movement information signal B+, a third movement information signal A− and a fourth movement information signal B−. The light-receiving part 152 is provided with 24 photodiodes 160, equal in number to the common multiplier (k) of (m=3) the number of the slits and (n=4) the number of the movement information signals.

Namely, the length of the photodiodes 160 of the light-receiving part 152 in the moving direction Z is one-sixth of the length of the photodiodes 106, and the width of the photodiodes 160 is equal to the width of the photodiodes 106. The light-receiving part 152 is composed of eight photodiode groups 152a to 152h which are arranged in the longitudinal direction (the moving direction Z) and each of the photodiode groups 152a to 152h is respectively composed of three photodiodes which are arranged in the longitudinal direction.

In FIG. 3, the first photodiode group 152a from the left is composed of three photodiodes $160_{31}$, $160_{21}$ and $160_{11}$, which are arranged at the pitch being 1/12 of the pitch P and adjoined each other with no gap. The second photodiode group 152b is composed of three photodiodes $160_{22}$, $160_{12}$ and $160_{41}$, which are arranged at the pitch being 1/12 of the pitch P and adjoined each other with no gap. The third photodiode group 152c is composed of three photodiodes $160_{42}$, $160_{32}$ and $160_{23}$, which are arranged at the pitch being 1/12 of the pitch P and adjoined each other with no gap.

The fourth photodiode group 152d is composed of three photodiodes $160_{33}$, $160_{43}$ and $160_{13}$, which are arranged at the pitch being 1/12 of the pitch P and adjoined each other with no gap. The fifth photodiode group 152e is composed of three photodiodes $160_{34}$, $160_{24}$ and $160_{14}$, which are arranged at the pitch being 1/12 of the pitch P and adjoined each other with no gap.

The sixth photodiode group 152f is composed of three photodiodes $160_{44}$, $160_{35}$, and $160_{25}$, which are arranged at the pitch being 1/12 of the pitch P and adjoined each other with no gap. The seventh photodiode group 152g from the left is composed of three photodiodes $160_{26}$, $160_{15}$ and $160_{45}$, which are arranged at the pitch being 1/12 of the pitch P and adjoined each other with no gap. The eighth photodiode group 152h from the left is composed of three photodiodes $160_{16}$, $160_{46}$ and $160_{36}$, which are arranged at the pitch being 1/12 of the pitch P and adjoined each other with no gap.

In the light-receiving parts 152, the pitch between the photodiode $160_{11}$ of the first photodiode group 152a and the photodiode $160_{22}$ of the second photodiode group 152b is made equal to one-sixth of the pitch P. The pitch between the photodiode $160_{41}$ of the second photodiode group 152b and the photodiode $160_{42}$ of the third photodiode group 152c is made equal to a quarter of the pitch P.

Similarly, the pitch between the photodiode $160_{23}$ of the third photodiode group 152c and the photodiode $160_{33}$ of the fourth photodiode group 152d is made equal to one-sixth of the pitch P. The pitch between the photodiode $160_{13}$ of the fourth photodiode group 152d and the photodiode $160_{34}$ of the fifth photodiode group 152e is made equal to a quarter of the pitch P.

The pitch between the photodiode $160_{14}$ of the fifth photodiode group 152e and the photodiode $160_{44}$ of the sixth photodiode group 152f is made equal to one-sixth of the pitch P. The pitch between the photodiode $160_{25}$ of the sixth photodiode group 152f and the photodiode $160_{26}$ of the seventh photodiode group 152g is made equal to a quarter of the pitch P. The pitch between the photodiode $160_{45}$ of the seventh photodiode group 152g and the photodiode $160_{16}$ of the eighth photodiode group 152h is made equal to one-sixth of the pitch P.

Six output terminals of the photodiodes $160_{11}$ to $160_{16}$ are connected so as to output the first movement information signal A+. Six output terminals of the photodiodes $160_{21}$ to $160_{26}$ are connected so as to output the second movement information signal B+. Six output terminals of the photodiodes $160_{31}$ to $160_{36}$ are connected so as to output the third movement information signal A−. Six output terminals of the photodiodes $160_{41}$ to $160_{46}$ are connected so as to output the fourth movement information signal B−.

Thus, the light-receiving part 152 of the third embodiment is provided with 24 photodiodes 160, which are obtained by each of the four photodiodes 106 of the light-receiving part 154 shown in region A being equally divided into six. Dispersion among the four independent output signals A+, B+, A− and B− obtained from the light-receiving part 152 is reduced, as compared with dispersion among the four independent output signals A+, B+, A− and B− obtained from the light-receiving part 154 by having subdivided photodiodes 160 and increasing the number of photodiodes (n=4) to (k=24) to be arranged for the same number (m=3) of slits.

Distance between each of the photodiodes 160 is consequently made smaller by increasing the number of the photodiodes 160 from four to 24 to be arranged for the same number (m=3) of slits. Since the light-receiving area of each of the photodiodes 160 is made smaller, difference in light quantity is sensitively detected.

According the third embodiment, in each of the photodiode groups 152a to 152h, three photodiodes 160 are adjoined each other with no gap so that there is no place for a separation part, which may cause photoelectric current between adjacent photodiodes. On the other hand, distance between each of the photodiodes is made smaller as compared with the second embodiment, so that dispersion among the four movement information signals is further made smaller and the balance among amplitudes and phases or the like of the four movement information signals is maintained.

In order to provide a separation part between each photodiode, as shown in region C of FIG. 1, photodiodes are equally divided into the least common multiple of (n) and (m) ((n) is the number of the movement information signals independently obtained and (m) is the number of the slits).

Fourth Embodiment

Figure 4:
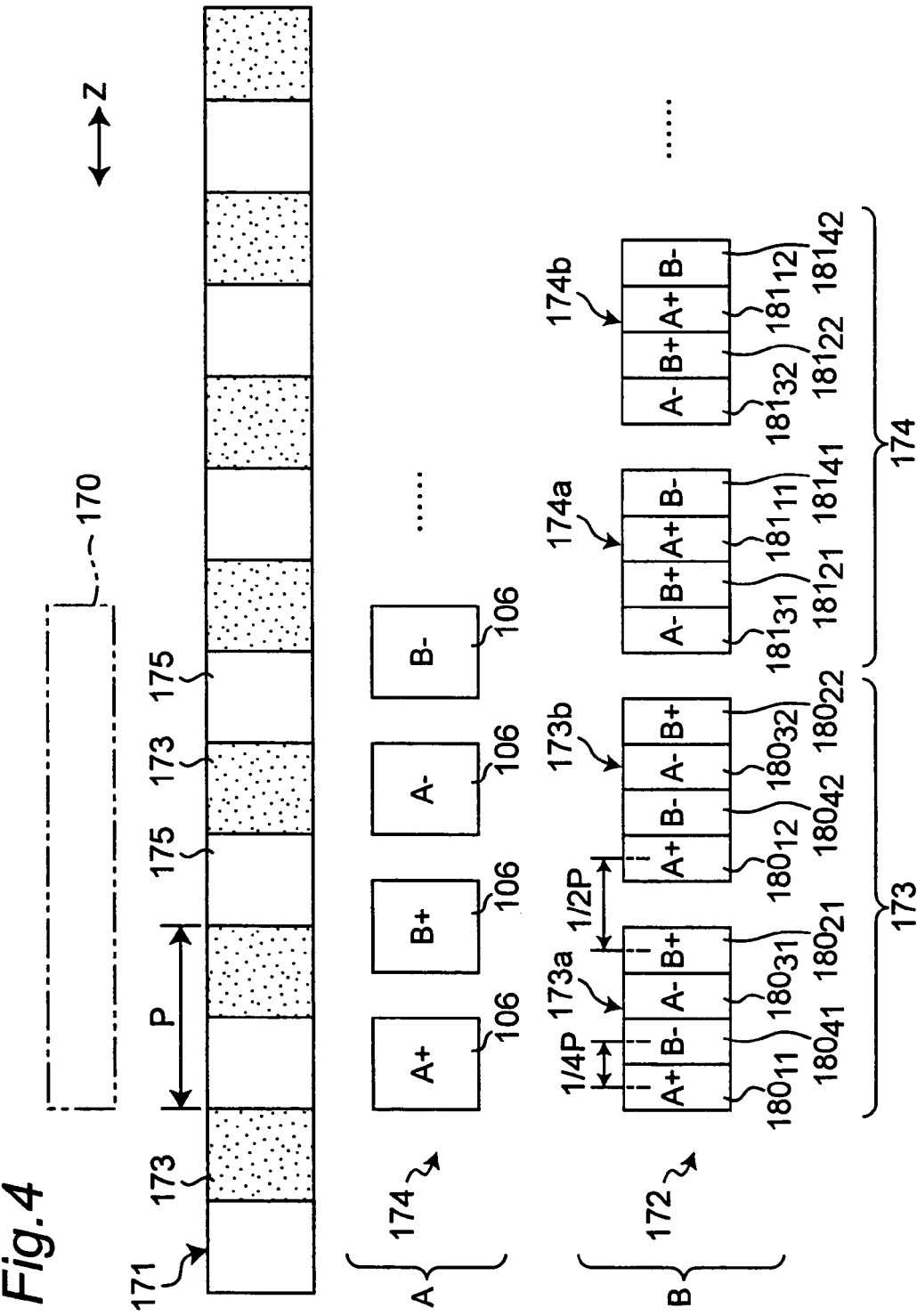
FIG. 4 schematically shows a fourth embodiment of the optical encoder according to the present invention.

Referring now to FIG. 4, there is shown a fourth embodiment of the optical encoder according to the present invention.

In the fourth embodiment, the optical encoder is provided with a light-emitting part 170, a light-receiving part 172 shown in region B of FIG. 4 and a moving body 170 which moves along a moving direction Z relative to the light-emitting part 171 and the light-receiving part 172. The light-emitting part and the light-receiving part 172 are arranged so as to face each other across the moving body 171. By way of an example, the light-emitting part 170 is composed of components such as a light-emitting diode.

The moving body 171 is provided with a plurality of slits 175 which are formed with a prescribed pitch P. The slits 175 function as light transmission areas. The moving body 171 moves along the direction Z in which the plurality of slits 175 are arranged. Lights emitted from the light-emitting part are transmitted through the slits 175 of the moving body 171 toward the light-receiving part 172, but the lights are blocked off by parts 173 between the slits 175. The parts 173 function as non-light transmission areas. The moving body 171 has the same constitution as the moving body 101 shown in FIG. 1.

In the fourth embodiment, the optical encoder is provided with the light-receiving part 172 shown in region B of FIG. 4 instead of a light-receiving part 174 shown in region A of FIG. 4 as a comparative example. The light-receiving part 174 as the comparative example is provided with photodiodes 106 which are the first to the fourth photodiodes from the left in the light-receiving part 104 shown in region A of FIG. 1.

As shown in region B of FIG. 4, the light-receiving part 172 in the fourth embodiment is provided with a first light-receiving part 173 and a second light-receiving part 174 which are arranged along the longitudinal direction (the moving direction Z).

The first light-receiving part 173 and the second light-receiving part 174, each of which is corresponding to two slits 175, output four independent movement signals, namely, a first movement information signal A+, a second movement information signal B+, a third movement information signal A− and a fourth movement information signal B−. The light-receiving part 173 is provided with eight photodiodes 180 equal in number to the common multiplier (k) of (m=2) the number of the slits and (n=4) the number of the movement information signals. Similarly, the second light-receiving part 174 is provided with eight photodiodes 181.

The length of each of the photodiodes 180 and 181 is equal to a quarter of P and a half of the photodiode 106. The width of each of the photodiodes 180 and 181 is equal to the width of the photodiodes 106. Namely, each of the photodiodes 180 and 181 is corresponding to one-half of the photodiode 106.

The first light-receiving part 173 is composed of photodiode groups 173a and 173b which are arranged along the longitudinal direction (the moving direction Z) The photodiode group 173a is composed of photodiodes $180_{11}$, $180_{41}$, $180_{31}$ and $180_{21}$ which are arranged along the longitudinal direction (the moving direction Z). The photodiode group 173b is composed of photodiodes $180_{12}$, $180_{42}$, $180_{32}$ and $180_{22}$ which are arranged along the longitudinal direction (the moving direction Z).

In the photodiode group 173a, four photodiodes $180_{11}$ to $180_{21}$ are arranged at the pitch being a quarter of the pitch P. In the photodiode group 173b, four photodiodes $180_{12}$ to $180_{22}$ are arranged at the pitch being a quarter of the pitch P.

The photodiode $180_{21}$ of the photodiode group 173a and the photodiode $180_{12}$ of the photodiode group 173b are arranged at the pitch being a half of the pitch P.

In the first light-receiving part 173, output terminals of the photodiodes $180_{11}$ and $180_{12}$ are connected so as to output a first movement information signal A+, and output terminals of the photodiodes $180_{21}$ and $180_{22}$ are connected so as to output a second movement information signal B+. Output terminals of the photodiodes $180_{31}$ and $180_{32}$ are connected so as to output a third movement information signal A−, and output terminals of the photodiodes $180_{41}$ and $180_{42}$ are connected so as to output a fourth movement information signal B+.

The second light-receiving part 174 is composed of photodiode groups 174a and 174b which are arranged along the longitudinal direction (the moving direction Z) The photodiode group 174a is composed of photodiodes $181_{31}$, $181_{21}$, $181_{11}$ and $181_{41}$ which are arranged along the longitudinal direction (the moving direction Z). The photodiode group 174b is composed of photodiodes $181_{32}$, $181_{22}$, $181_{12}$ and $181_{42}$ which are arranged along the longitudinal direction (the moving direction Z).

In the photodiode group 174a, four photodiodes $180_{31}$ to $180_{41}$ are arranged at the pitch being a quarter of the pitch P. In the photodiode group 174b, four photodiodes $180_{32}$ to $180_{42}$ are arranged at the pitch being a quarter of the pitch P.

The photodiode $180_{41}$ of the photodiode group 174a and the photodiode $180_{32}$ of the photodiode group 174b are arranged at the pitch being a half of the pitch P.

In the second light-receiving part 174, output terminals of the photodiodes $181_{11}$ and $181_{12}$ are connected so as to output a first movement information signal A+, and output terminals of the photodiodes $181_{21}$ and $181_{22}$ are connected so as to output a second movement information signal B+. Output terminals of the photodiodes $181_{31}$ and $181_{32}$ are connected so as to output a third movement information signal A−, and output terminals of the photodiodes $181_{41}$ and $181_{42}$ are connected so as to output a fourth movement information signal B+.

According to the fourth embodiment, dispersion among the four independent output signals A+, B+, A− and B− which are outputted from the first light-receiving part 173 and the second light-receiving part 174 shown in region A, is reduced by providing each of subdivided photodiodes 180 and 181 in the light-receiving part 172 shown in region B as compared with each of the photodiodes 106 of the light-receiving part 174. In the present embodiment, distance between each of the photodiodes is consequently made smaller and a light-receiving area of each of the photodiodes is also made smaller, so that difference in light quantity is sensitively detected.

In the present embodiment, each of the photodiodes 180 in the first light-receiving part 173 are arranged corresponding each of the movement information signals (A+, B−, A− and B+) and each of the photodiodes 181 in the second light-receiving part 174 are arranged corresponding each of the movement information signals (A−, B+, A+ and B−). The arrangement orders of photodiodes corresponding each of the movement information signals are thus varied between the first light-receiving part 173 and the second light-receiving part 174, so that the light quantity variance distributed to each photodiodes is suppressed with the result that dispersions of light quantity balance or the like are suppressed.

As shown in FIG. 4, a third light-receiving part which has the same constitution as the first light-receiving part 173 may be arranged on the right neighbor of the second light-receiving part 174, and a fourth light-receiving part which has the same constitution as the second light-receiving part 174 may be further arranged on the right neighbor of the third light-receiving part. In a similar manner, a prescribed number of light-receiving parts which have the same constitutions as the first light-receiving part and the second light-receiving part may be alternately arranged.

According to the fourth embodiment, in each of the photodiode groups 173*a*, 173*b*, 174*a* and 174*b*, four photodiodes 180 and 181 are adjoined each other with no gap so that there is no place for a separation part, which may cause photoelectric current between adjacent photodiodes. On the other hand, distance between each of the photodiodes is made smaller as compared with the above two embodiments, so that dispersion among the four movement information signals is further made smaller and the balance among amplitudes and phases of the four movement information signals or the like is maintained.

The optical encoder is provided with a greater number of subdivided photodiodes as compared with the comparative example, as shown in the first to fourth embodiments, in which (m), the number of the slits, provided for the moving body is effectively chosen based on a balance among factors such as a quantity of lights received from the light source of the light-emitting part. The number of the slits is also effectively subdivided corresponding to (n), the number of the movement information signals. The slits are effectively arranged appropriately based on the optical characteristics and properties of the photodiodes.

The profile of the slits of the moving body is preferably matched with the profile of the photodiodes in order to obtain movement information of the moving body. When the moving body is of disk shape and the slits are of sectorial shape, the photodiodes are preferably of sectorial shape.

Figure 5:
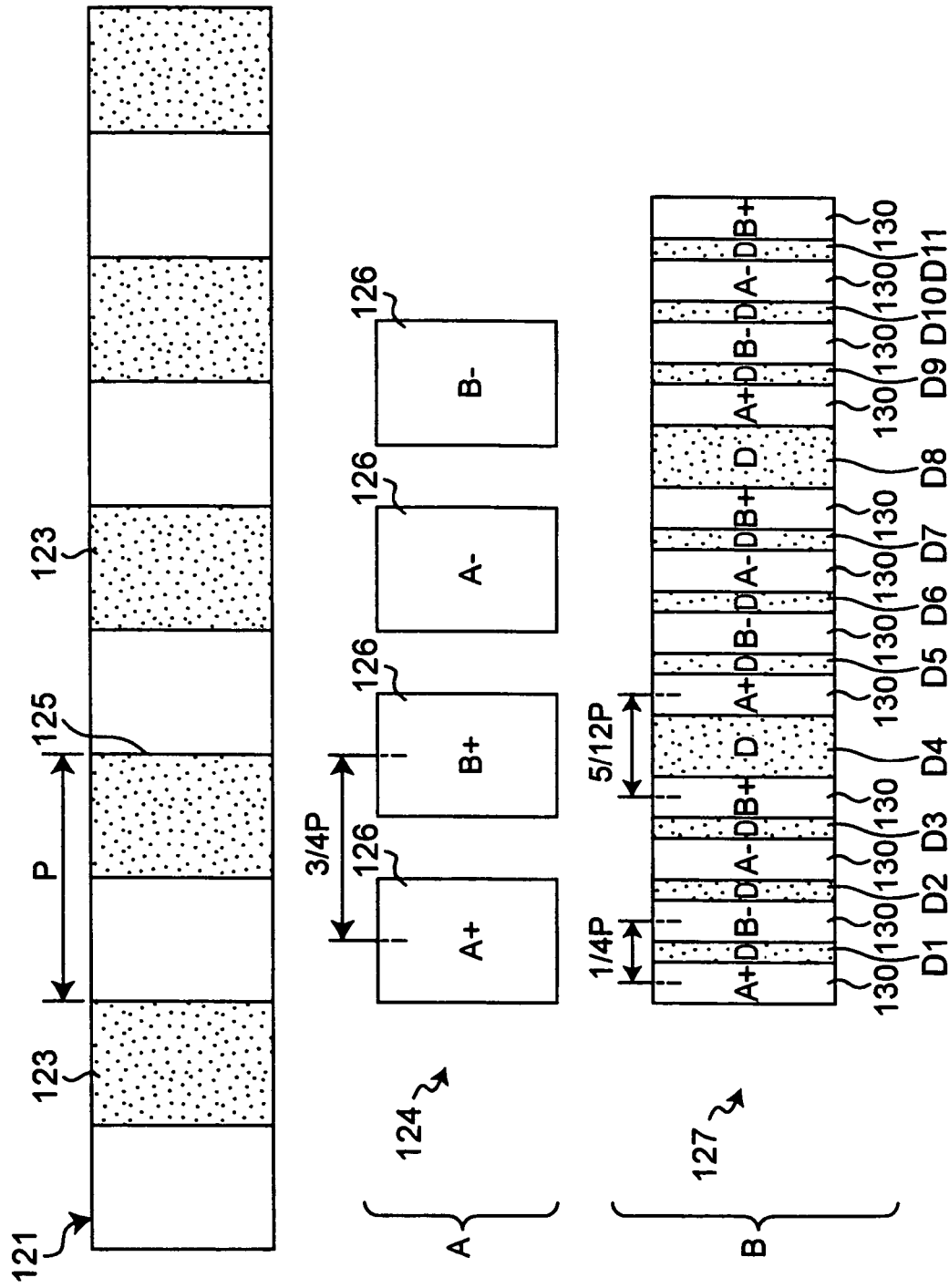
FIG. 5 schematically shows a modified example of the second embodiment.

As shown in region B of FIG. 5, the light-receiving part 127 shown in region B of FIG. 2 may be provided with dummy photodiodes (non-activated photodiodes) in remaining parts D1 to D11 between each of the photodiodes 130, regarding a semiconductor chip on which each of the photodiodes 130 is formed. In this case, interference due to signals of each of the photodiodes 130 sneaking into another signal is prevented by absorbing electrons generated by photoelectric conversion in each of the photodiodes 130 using the dummy photodiodes D1 to D11. When the dummy photodiodes are electrically grounded, the signals are further prevented from sneaking into another signal. These dummy photodiodes may be employed for the light-receiving part 110 shown in region C of FIG. 1 and the light-receiving part 152 shown in region B of FIG. 3.

It would be further effective if photodiodes formed in remaining parts D1 to D11 shown in FIG. 5 are utilized not only as dummy photodiodes but also for detecting information other than movement information of the moving body including slit positions of the moving body, light quantity distribution, parallel beams, distance between a slit and a photodiode.

For example, if it is difficult to subdivide photodiodes in the forming process of photodiodes in the light-receiving part of the optical encoder of the first to the fourth embodiment, a part of the photodiodes can be advantageously used as the dummy photodiodes. Photodiodes are separated by a metal film for blocking off lights and P-type impurity diffusion. Lights are prevented from sneaking using the above two method. Other effective methods to separate photodiodes include trench separation using a polycrystalline silicon film and oxide film separation.

To form the photodiodes, a method using an epitaxial film and impurity diffusion and a method using a semiconductor substrate and an epitaxial film are preferably employed.

In the case of the photodiodes formed using a semiconductor substrate and an epitaxial film, more photocurrent is obtained by shielding the photodiodes using impurity diffusion. Reflection of lights is suppressed and more photocurrent is obtained by forming an antireflection film on the photodiodes.

Figure 6:
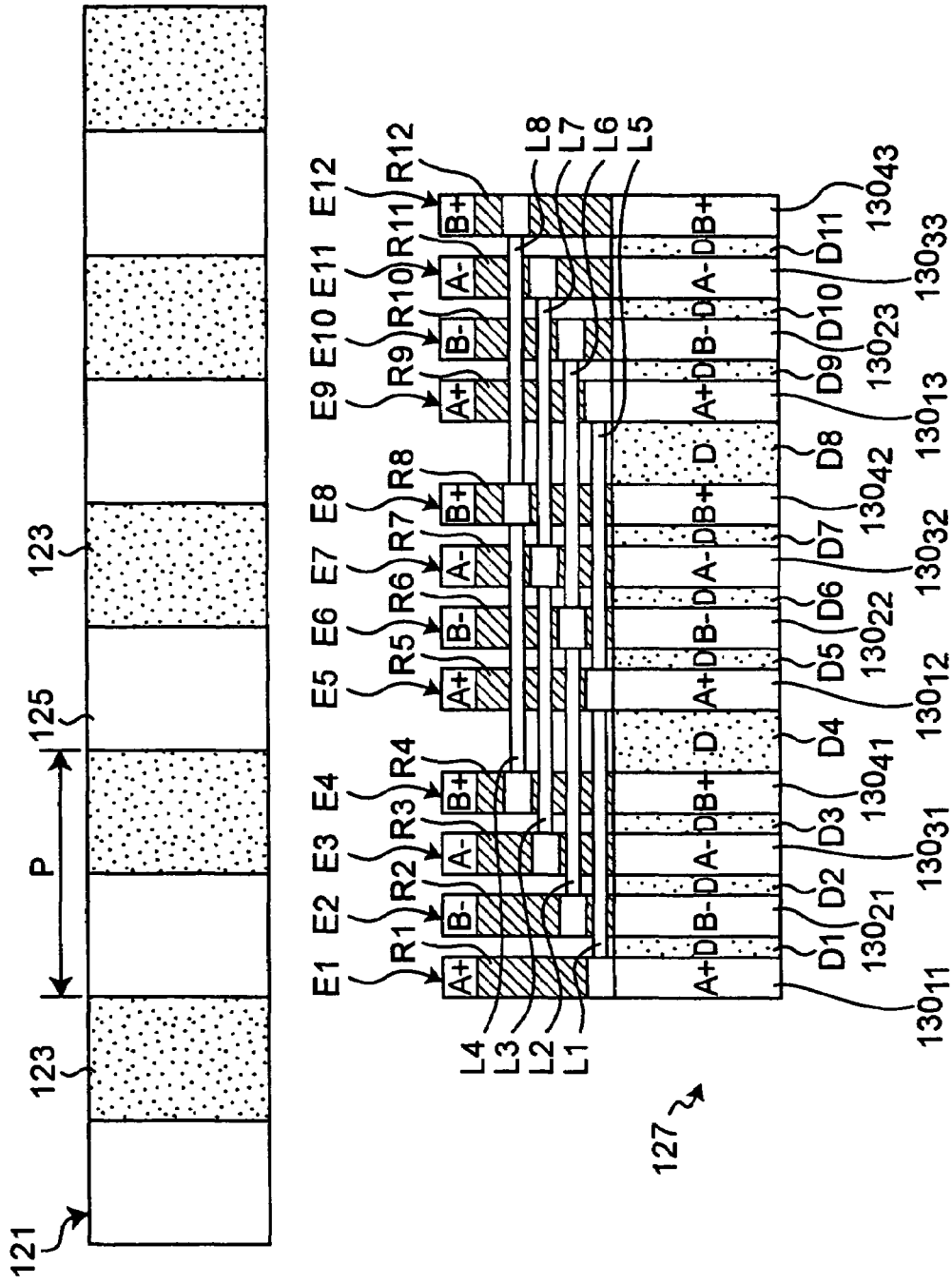
FIG. 6 schematically shows another modified example of the second embodiment.
Figure 7:
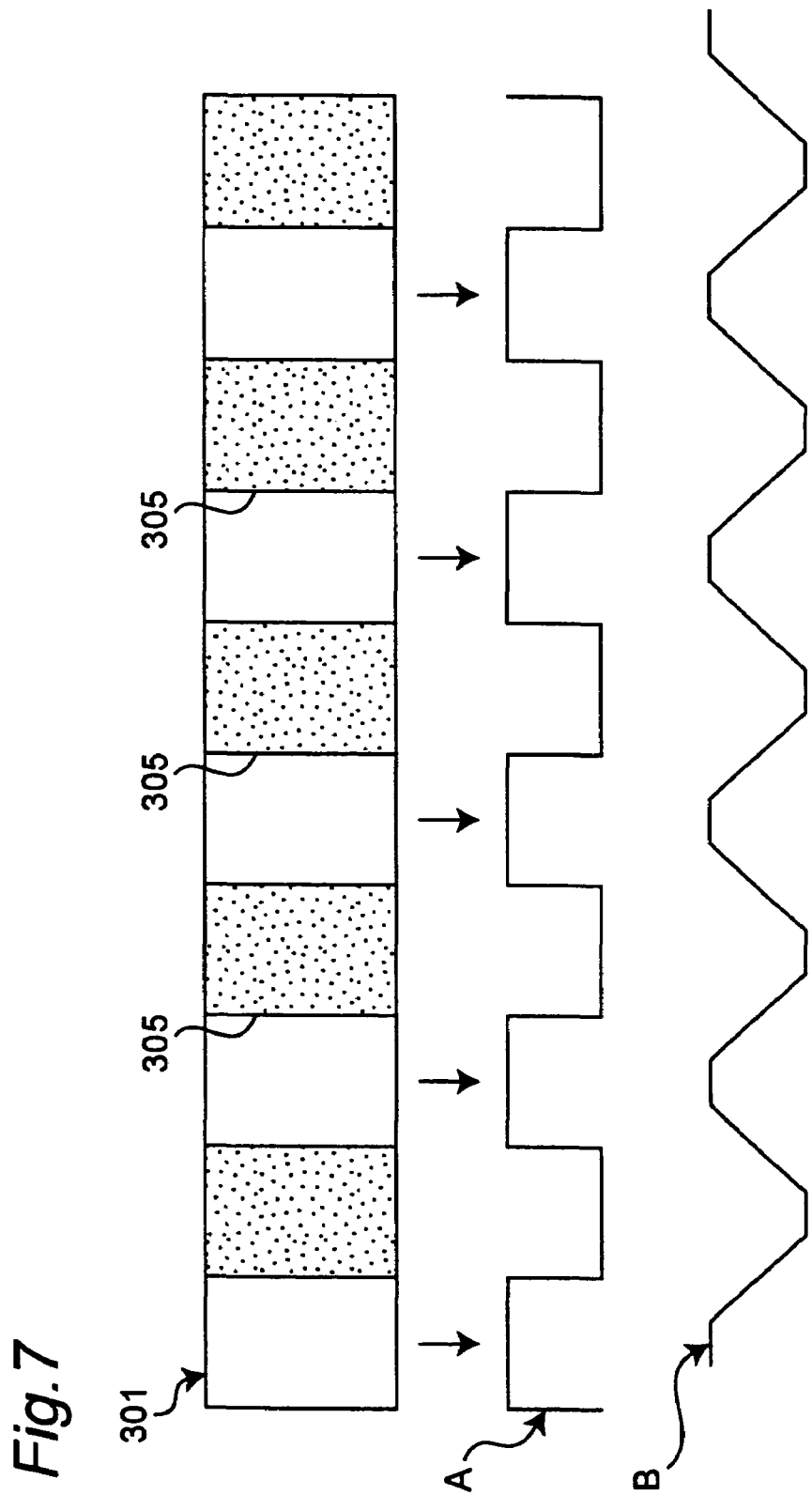

Cross under resistors R1 to R12, as shown in FIG. 6, may be formed on a semiconductor chip on which each of the subdevided photodiodes 130 of the light-receiving part 127 shown in region B of FIG. 5 is formed. The cross under resistors R1 to R12 are formed by diffusing impurities in crosshatched parts in extended areas E1 to E12 from each of the photodiodes $130_{11}$ to $130_{43}$ in the widthwise direction shown in FIG. 6.

A non-diffusion part of the extended areas E1 and a non-diffusion part of the extended areas E5 are electrically connected in a connecting part L1, and a non-diffusion part of the extended areas E5 and a non-diffusion part of the extended areas E9 are electrically connected in a connecting part L5. As a result, the first movement information signal A+ is outputted from the non-diffusion parts in each of the extended areas E1, E5 and E9, which is the sum of output signals from the three photodiodes $130_{11}$, $130_{12}$ and $130_{13}$.

A non-diffusion part of the extended areas E2 and a non-diffusion part of the extended areas E6 are electrically connected in a connecting part L2, and a non-diffusion part of the extended areas E6 and a non-diffusion part of the extended areas E10 are electrically connected in a connecting part L6. As a result, the second movement information signal B− is outputted from the non-diffusion parts in each of the extended areas E2, E6 and E10, which is the sum of output signals from the three photodiodes $130_{21}$, $130_{22}$ and $130_{23}$.

A non-diffusion part of the extended areas E3 and a non-diffusion part of the extended areas E7 are electrically connected in a connecting part L3, and a non-diffusion part of the extended areas E7 and a non-diffusion part of the extended areas E11 are electrically connected in a connecting part L7. As a result, the third movement information signal A− is outputted from the non-diffusion parts in each of the extended areas E3, E7 and E11, which is the sum of output signals from the three photodiodes $130_{31}$, $130_{32}$ and $130_{33}$.

A non-diffusion part of the extended areas E4 and a non-diffusion part of the extended areas E8 are electrically connected in a connecting part L4, and a non-diffusion part of the extended areas E8 and a non-diffusion part of the extended areas E12 are electrically connected in a connecting part L8. As a result, the third movement information signal B+ is outputted from the non-diffusion parts in each of the extended areas E4, E8 and E12, which is the sum of output signals from the three photodiodes $130_{41}$, $130_{42}$ and $130_{43}$.

Thus, the constitution shown in FIG. 6 allows the first to the fourth independent movement information signals being the sum of the three output signals to be taken from various locations with the result the light-receiving part 127 is easily connected to a circuit of the subsequent stages.

In each of the above embodiments, the balance among light quantities which contribute to the movement information signals to be obtained independently is maintained by arranging the photodiodes provided for the light-receiving part symmetrically with respect to the light source provided for the light-receiving part. The light source of the light-receiving part contains a collimating lens with the result that lights are condensed and parallel beams are emitted, which is useful for obtaining accurate movement information. The optical encoder of each of the above embodiments is suitable for uses such as printing apparatuses and a light sensor for factory automation equipment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical encoder which comprises
  a moving body wherein light transmission areas and non-light transmission areas are alternately formed along a moving direction, a light-emitting part for emitting lights toward the moving body, and a light-receiving part for receiving lights emitted from the light-emitting part and transmitted through the light transmission areas and outputting a plurality of independent movement information signals which represent the movement information of the moving body, wherein
  the light-receiving part which is arranged so as to face a plurality of the light transmission areas, outputs a plurality of the independent movement information signals and comprises photodiodes equal in number to a common multiplier of a number of the light transmission areas facing the light-receiving part and a number of the independent movement information signals;
  wherein the photodiodes include at least a first group of photodiodes and a second group of photodiodes, the photodiodes in the first and second groups being disposed for a plurality of the light transmission areas of the moving body, and wherein output terminals of the first group of photodiodes are connected so that a first of the plurality of movement information signals is obtained by adding output signals of the plurality of photodiodes in the first group, and wherein output terminals of the second group of photodiodes are connected so that a second of the plurality of movement information signals is obtained by adding output signals of the plurality of photodiodes in the second group;
  a number of the light transmission areas facing each of the light-receiving parts is three, a number of the independent movement information signals is four, and the light-receiving part comprises 12 photodiodes;
  when the moving direction of the moving body is considered as a longitudinal direction and an arrangement pitch in the light transmission area is considered as one pitch, the 12 photodiodes are arranged along the longitudinal direction, having a length equal to one-sixth of the pitch respectively;
  the light-receiving part comprises three photodiode groups, each of which is composed of the four photodiodes, distance between each of the photodiodes in each of the photodiode groups is $1/12$ of the pitch, in two adjacent photodiode groups, a photodiode in one photodiode group closest to the other photodiode group and a photodiode in the other photodiode group closest to the one photodiode group are adjoined at a pitch $5/12$ of the pitch; and
  four photodiodes in the photodiode groups respectively output output signals corresponding to four independent different movement information signals, and output one movement information signal by adding output signals of the three photodiodes corresponding to one movement information signal out of four movement information signals outputted from the three photodiode groups.

2. The optical encoder as set forth in claim 1, wherein a size of the light transmission area of the moving body in a widthwise direction orthogonal to the moving direction and a size of at least one of the photodiodes in the widthwise direction are made equal.

3. The optical encoder as set forth in claim 1, wherein
  the moving body is of disk shape wherein light transmission areas of sectorial shape and non-light transmission areas of sectorial shape are circumferentially and alternately formed, and the moving direction is circumferential;
  a profile of the photodiodes provided for the light-receiving part is made sectorial shape so as to be matched with the light transmission areas of sectorial shape.

4. The optical encoder as set forth in claim 1, wherein additional photodiodes for detecting information other than movement information of the moving body are arranged between the photodiodes provided for the light-receiving part.

5. The optical encoder as set forth in claim 4, wherein the additional photodiodes for detecting information other than movement information of the moving body are arranged between the photodiodes provided for the light-receiving part, and movement information is obtained by adding output signals of the additional photodiodes to output signals outputted from the photodiodes provided for the light-receiving part.

6. The optical encoder as set forth in claim 1, wherein
a plurality of photodiodes provided for the light-receiving part are formed on a semiconductor chip; and
cross under resistors under wiring for electrically connecting the plurality of the photodiodes are provided which are intersected with the wiring, and the cross under resistors are made by impurity diffusion in the semiconductor chip.

7. The optical encoder of claim 1, wherein the encoder is provided in a printer and/or copier apparatus.

8. An optical encoder which comprises
a moving body wherein light transmission areas and non-light transmission areas are alternately formed along a moving direction, a light-emitting part for emitting lights toward the moving body, and a light-receiving part for receiving lights emitted from the light-emitting part and transmitted through the light transmission areas and outputting movement information signals which represent the movement information of the moving body, wherein
the light-receiving part which is arranged so as to face a plurality of the light transmission areas, outputs a plurality of the independent movement information signals and comprises photodiodes equal in number to a common multiplier of a number of the light transmission areas facing the light-receiving part and a number of the independent movement information signals;
output terminals of a plurality of the photodiodes are connected so that the plurality of the movement information signals are respectively obtained by adding output signals of the plurality of photodiodes out of the photodiodes equal in number to the common multiplier;
a plurality of the light-receiving parts having the photodiodes equal in number to the common multiplier;
a number of the light transmission areas facing each of the light-receiving parts is three, a number of the independent movement information signals is four, and each of the light-receiving parts comprises 12 photodiodes;
when the moving direction of the moving body is considered as a longitudinal direction and an arrangement pitch in the light transmission area is considered as one pitch, the 12 photodiodes are arranged along the longitudinal direction, having a length equal to one-sixth of the pitch respectively; each of the light-receiving parts comprises three photodiode groups, each of which is composed of the four photodiodes, distance between each of the photodiodes in each of the photodiode groups is $1/12$ of the pitch, in two adjacent photodiode groups, a photodiode in one photodiode group closest to the other photodiode group and a photodiode in the other photodiode group closet to the one photodiode group are adjoined at a pitch $5/12$ of the pitch; and
four photodiodes in each of the photodiode groups respectively output output signals corresponding to four independent different movement information signals, and output one movement information signal by adding output signals of the three photodiodes corresponding to one movement information signal out of four movement information signals outputted from the three photodiode groups.

9. The optical encoder as set forth in claim 8, wherein
four photodiodes of the three photodiode groups provided for each of the light-receiving parts comprises a first photodiode for outputting an output signal corresponding to a first movement information signal, a second photodiode for outputting an output signal corresponding to a second movement information signal, a third photodiode for outputting an output signal corresponding to a third movement information signal and a fourth photodiode for outputting an output signal corresponding to a fourth movement information signal; and
in each of the three photodiode groups in one light-receiving part out of two adjacent light-receiving parts, the first photodiode, the second photodiode, the third photodiode and the fourth photodiode are arranged along the moving direction in order, and in each of the three photodiode groups of the other light-receiving part out of two adjacent light-receiving parts, the third photodiode, the fourth photodiode, the first photodiode and the second photodiode are arranged along the moving direction in order.

10. An optical encoder which comprises
a moving body wherein light transmission areas and non-light transmission areas are alternately formed along a moving direction, a light-emitting part for emitting lights toward the moving body, and a light-receiving part for receiving lights emitted from the light-emitting part and transmitted through the light transmission areas and outputting movement information signals which represent the movement information of the moving body, wherein
the light-receiving part which is arranged so as to face a plurality of the light transmission areas, outputs a plurality of the independent movement information signals and comprises photodiodes equal in number to a common multiplier of a number of the light transmission areas facing the light-receiving part and a number of the independent movement information signals;
output terminals of a plurality of the photodiodes are connected so that the plurality of the movement information signals are respectively obtained by adding output signals of the plurality of photodiodes out of the photodiodes equal in number to the common multiplier;
a number of the light transmission areas facing the light-receiving part is three, a number of the independent movement information signals is four, and the light-receiving part comprises 24 photodiodes;
when the moving direction of the moving body is considered as a longitudinal direction and an arrangement pitch in the light transmission area is considered as one pitch, the 24 photodiodes are arranged along the longitudinal direction, having a length equal to $1/12$ of the pitch respectively;
the light-receiving part comprises eight photodiode groups each of which is composed of the three photodiodes, and the three photodiodes in each of the photodiode groups arranged at a pitch $1/12$ of the pitch;
the eight photodiode groups is composed of the first to the eighth photodiode groups arranged along the moving direction in order;
a pitch between the first photodiode group and the second photodiode group, a pitch between the third photodiode group and the fourth photodiode group, a pitch between the fifth photodiode group and the sixth photodiode group and a pitch between the seventh photodiode group and the eighth photodiode group are $1/12$ of the pitch;
a pitch between the second photodiode group and the third photodiode group, a pitch between the fourth photodiode group and the fifth photodiode group, and a pitch between the sixth photodiode group and the seventh photodiode group are one-sixth of the pitch; and three photodiodes in each of the photodiode groups respectively output output signals corresponding to different movement information signals from one another, and output one movement information signal by adding output signals of six photodiodes corresponding to one movement information signal out of four movement information signals outputted from the eight photodiode groups.

11. An optical encoder which comprises a moving body wherein light transmission areas and non-light transmission areas are alternately formed along a moving direction, a light-emitting part for emitting lights toward the moving body, and a light-receiving part for receiving lights emitted from the light-emitting part and transmitted through the light transmission areas and outputting movement information signals which represent the movement information of the moving body, wherein the light-receiving part which is arranged so as to face a plurality of the light transmission areas, outputs a plurality of the independent movement information signals and comprises photodiodes equal in number to a common multiplier of a number of the light transmission areas facing the light-receiving part and a number of the independent movement information signals;

output terminals of a plurality of the photodiodes are connected so that the plurality of the movement information signals are respectively obtained by adding output signals of the plurality of photodiodes out of the photodiodes equal in number to the common multiplier;

a number of the light transmission areas facing the light-receiving part is two, a number of the independent movement information signals is four, and the light-receiving part comprises eight photodiodes;

when the moving direction of the moving body is considered as a longitudinal direction and an arrangement pitch in the light transmission area is considered as one pitch, the eight photodiodes are arranged along the longitudinal direction, having a length equal to a quarter of the pitch respectively;

the light-receiving part comprises two photodiode groups each of which is composed of the four photodiodes, and the four photodiodes in each of the photodiode groups arranged at a ¼ of the pitch;

in two adjacent photodiode groups, a photodiode in one photodiode group closest to the other photodiode group and a photodiode in the other photodiode group closet to the one photodiode group are adjoined at a half of the pitch;

four photodiodes in each of the photodiode groups respectively output output signals corresponding to four independent different movement information signals, and output one movement information signal by adding output signals of two photodiodes corresponding to one movement information signal out of four movement information signals outputted from the two photodiode groups.

12. The optical encoder as set forth in claim 11, comprising a plurality of the light-receiving parts, wherein four photodiodes of the two photodiode groups provided for each of the light-receiving parts are composed of a first photodiode for outputting an output signal corresponding to a first movement information signal, a second photodiode for outputting an output signal corresponding to a second movement information signal, a third photodiode for outputting an output signal corresponding to a third movement information signal and a fourth photodiode for outputting an output signal corresponding to a fourth movement information signal; and in each of the two photodiode groups of one light-receiving part out of two adjacent light-receiving parts, the first photodiode, the second photodiode, the third photodiode and the fourth photodiode are arranged along the moving direction in order, and in each of the two photodiode groups of the other light-receiving part out of two adjacent light-receiving parts, the third photodiode, the fourth photodiode, the first photodiode and the second photodiode are arranged along the moving direction in order.

* * * * *